(12) United States Patent
Wang et al.

(10) Patent No.: US 11,800,441 B2
(45) Date of Patent: Oct. 24, 2023

(54) DIFFERENTIATION BETWEEN STANDALONE AND NON-STANDALONE CELLS IN A WIRELESS COMMUNICATIONS SYSTEM

(71) Applicant: QUALCOMM Incorporated, San Diego, CA (US)

(72) Inventors: Shanshan Wang, San Diego, CA (US); Reza Shahidi, San Diego, CA (US); Yongle Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 17/369,802

(22) Filed: Jul. 7, 2021

(65) Prior Publication Data

US 2022/0015029 A1    Jan. 13, 2022

Related U.S. Application Data

(60) Provisional application No. 63/050,570, filed on Jul. 10, 2020.

(51) Int. Cl.
*H04W 48/20* (2009.01)
*H04W 48/16* (2009.01)
*H04W 36/08* (2009.01)
*H04W 48/08* (2009.01)
*H04W 36/00* (2009.01)

(52) U.S. Cl.
CPC ..... *H04W 48/20* (2013.01); *H04W 36/00835* (2018.08); *H04W 36/08* (2013.01); *H04W 48/08* (2013.01); *H04W 48/16* (2013.01)

(58) Field of Classification Search
CPC ............... H04W 48/20; H04W 48/08; H04W 36/00835; H04W 36/08; H04W 48/16; H04W 36/0061; H04W 36/0069; H04W 76/15; H04W 36/0083; H04W 36/0094; H04W 88/08
See application file for complete search history.

(56) References Cited

U.S. PATENT DOCUMENTS

| | | | |
|---|---|---|---|
| 2019/0069205 A1* | 2/2019 | Lee | H04W 36/00835 |
| 2019/0357095 A1* | 11/2019 | Pakniat | H04W 36/0094 |
| 2020/0029165 A1* | 1/2020 | Kumar | G01S 5/0215 |
| 2020/0281026 A1* | 9/2020 | Yan | H04W 74/0833 |
| 2020/0305015 A1* | 9/2020 | Yang | H04W 36/0061 |
| 2021/0160745 A1* | 5/2021 | Kimba Dit Adamou | H04W 36/0061 |
| 2021/0250115 A1* | 8/2021 | Harada | H04L 5/0094 |
| 2021/0298055 A1* | 9/2021 | Harada | H04W 56/001 |
| 2021/0314853 A1* | 10/2021 | Bai | H04W 48/12 |

\* cited by examiner

*Primary Examiner* — Allahyar Kasraian
(74) *Attorney, Agent, or Firm* — Holland & Hart LLP

(57) ABSTRACT

Methods, systems and devices for wireless communications are described for differentiation between standalone (SA) and non-standalone (NSA) cells in a wireless communications system. A user equipment (UE) may receive an indication of a subcarrier offset for a system information block (SIB). The SIB may be for a cell of a wireless communications network. The cell may be in accordance with a radio access technology. The UE may determine, based on the subcarrier offset for the SIB, whether the cell is configured as an SA cell or as an NSA cell for the radio access technology. The UE may communicate via the wireless communications network based on whether the cell is configured as an SA cell or as an NSA cell.

20 Claims, 11 Drawing Sheets

DIFFERENTIATION BETWEEN STANDALONE AND NON-STANDALONE CELLS IN A WIRELESS COMMUNICATIONS SYSTEM

CROSS REFERENCE

The present Application for Patent claims the benefit of U.S. Provisional Patent Application No. 63/050,570 by Wang et al., entitled "DIFFERENTIATION BETWEEN STANDALONE AND NON-STANDALONE CELLS IN A WIRELESS COMMUNICATIONS SYSTEM," filed Jul. 10, 2020, assigned to the assignee hereof, and expressly incorporated by reference herein.

FIELD OF TECHNOLOGY

The following relates generally to wireless communications and more specifically to differentiation between standalone (SA) and non-standalone (NSA) cells in a wireless communications system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipments (UEs). One or more base stations may provide communication coverage via one or more cells, for example a macro cell, a small cell, a hot spot, or other types of cells, or any combination thereof as described herein. A cell may be configured to operate in a standalone (SA) mode (referred to as an SA cell) or in a non-standalone (NSA) mode (referred to as an NSA cell). In some cases, a UE may be unable to differentiate between SA cells and NSA cells when attempting to camp on a respective cell. This may impact cell selection and reselection operations for the UE and may increase a latency for camping on a cell and accessing a network, among other drawbacks that may be appreciated by one of ordinary skill in the art.

SUMMARY

The described techniques relate to improved methods, systems, devices, and apparatuses that support or otherwise utilize differentiation between standalone (SA) and non-standalone (NSA) cells in a wireless communications system. A user equipment (UE) may attempt to select a respective cell to connect to a network (e.g., a fourth generation (4G) network, a fifth generation (5G) network, or the like) based on system information received from a base station associated with the respective cell. The system information may include one or multiple parameters (e.g., subcarrier offset information, tracking area code (TAC) information, etc.) that the UE may use to determine whether the respective cell is configured as an SA cell or an NSA cell. In some cases, the UE may perform cell selection or cell reselection operations based on whether the respective cell is an SA cell or an NSA cell. Additionally or alternatively, the UE may perform cell selection or cell reselection operations based on a cell camping record (e.g., a log of cells on which the UE may have previously camped on). The UE may thereby avoid attempting to camp on NSA cells, which may reduce a latency for the UE to camp on a cell and access a network.

A method of wireless communication at a UE is described. The method may include receiving an indication of a subcarrier offset for a system information block (SIB), the SIB for a cell of a wireless communications network, the cell in accordance with a radio access technology, determining, based on the subcarrier offset for the SIB, whether the cell is configured as an SA cell or as an NSA cell for the radio access technology, and communicating via the wireless communications network based on whether the cell is configured as an SA cell or as an NSA cell.

An apparatus for wireless communication is described. The apparatus may include a processor, memory coupled with the processor, and instructions stored in the memory. The instructions may be executable by the processor to cause the apparatus to receive an indication of a subcarrier offset for a SIB, the SIB for a cell of a wireless communications network, the cell in accordance with a radio access technology, determine, based on the subcarrier offset for the SIB, whether the cell is configured as an SA cell or as an NSA cell for the radio access technology, and communicate via the wireless communications network based on whether the cell is configured as an SA cell or as an NSA cell.

Another apparatus for wireless communication is described. The apparatus may include means for receiving an indication of a subcarrier offset for a SIB, the SIB for a cell of a wireless communications network, the cell in accordance with a radio access technology, determining, based on the subcarrier offset for the SIB, whether the cell is configured as an SA cell or as an NSA cell for the radio access technology, and communicating via the wireless communications network based on whether the cell is configured as an SA cell or as an NSA cell.

A non-transitory computer-readable medium storing code for wireless communication at a UE is described. The code may include instructions executable by a processor to receive an indication of a subcarrier offset for a SIB, the SIB for a cell of a wireless communications network, the cell in accordance with a radio access technology, determine, based on the subcarrier offset for the SIB, whether the cell is configured as an SA cell or as an NSA cell for the radio access technology, and communicate via the wireless communications network based on whether the cell is configured as an SA cell or as an NSA cell.

In some examples of the method, apparatuses, and non-transitory computer-readable medium described herein, determining whether the cell may be configured as an SA cell or as an NSA cell may include operations, features, means, or instructions for determining that the subcarrier offset for the SIB may be within a range, and determining, based on the subcarrier offset for the SIB being within the range, that the cell may be configured as an NSA cell.

In some examples of the method, apparatuses, and non-transitory computer-readable medium described herein, determining whether the cell may be configured as an SA cell or as an NSA cell may include operations, features, means, or instructions for determining that the subcarrier offset for the SIB may be within a second range, receiving, from a base station associated with the cell, the SIB based on the subcarrier offset for the SIB, determining, based on SIB and the subcarrier offset for the SIB being within the second range, whether a TAC may be configured for the cell, and determining, based on whether the TAC may be configured for the cell, whether the cell may be configured as an SA cell or as an NSA cell.

In some examples of the method, apparatuses, and non-transitory computer-readable medium described herein, determining whether the cell may be configured as an SA cell or as an NSA cell may include operations, features, means, or instructions for determining that the TAC may be configured for the cell, and determining, based on the TAC being configured for the cell, that the cell may be configured as an SA cell.

In some examples of the method, apparatuses, and non-transitory computer-readable medium described herein, determining whether the cell may be configured as an SA cell or as an NSA cell may include operations, features, means, or instructions for determining that the TAC may be not configured for the cell, and determining, based on the TAC not being configured for the cell, that the cell may be configured as an NSA cell.

Some examples of the method, apparatuses, and non-transitory computer-readable medium described herein may further include operations, features, means, or instructions for identifying an operator of the cell, and storing an indication of whether the TAC may be configured for the cell, the indication specific to the operator of the cell.

In some examples of the method, apparatuses, and non-transitory computer-readable medium described herein, the cell may include a second cell of a first base station, and the method, apparatuses, and non-transitory computer-readable medium may further include operations, features, means, or instructions for camping on a first cell of the first base station or of a second base station, the camping using a set of one or more frequencies, and the first cell configured as an SA cell, reselecting to the second cell after camping on the first cell, where receiving the subcarrier offset for the SIB for the second cell may be based on reselecting to the second cell, receiving, based on the reselecting, a first indication that the UE may be barred from communicating via the second cell using the set of one or more frequencies, receiving, based on the reselecting, a second indication that intra-frequency reselection may be not allowed for the set of one or more frequencies, and reselecting, based on the first cell being configured as an SA cell and determining that the second cell may be configured as an NSA cell, and after receiving the first indication and the second indication, to a third cell using the set of one or more frequencies.

Some examples of the method, apparatuses, and non-transitory computer-readable medium described herein may further include operations, features, means, or instructions for maintaining a log of cells on which the UE may have camped using a set of one or more frequencies.

Some examples of the method, apparatuses, and non-transitory computer-readable medium described herein may further include operations, features, means, or instructions for receiving a first indication that the UE may be barred from communicating via the cell using the set of one or more frequencies, receiving a second indication that intra-frequency reselection may be not allowed for the set of one or more frequencies, and determining, after receiving the first indication and the second indication, whether to attempt to camp on one or more other cells using the set of one or more frequencies based on whether the log of cells may be empty, whether the cell may be configured as an SA cell or as an NSA cell, or both.

Some examples of the method, apparatuses, and non-transitory computer-readable medium described herein may further include operations, features, means, or instructions for determining, based on the log of cells being empty and the cell being configured as an NSA cell, whether to attempt to camp on one or more other cells using the set of one or more frequencies based on a duration associated with maintaining the log, a mobility metric for the UE, or both, and refraining from attempting to camp on the one or more other cells using the set of one or more frequencies based on the duration associated with maintaining the log satisfying a first threshold, the mobility metric for the UE satisfying a second threshold, or both.

Some examples of the method, apparatuses, and non-transitory computer-readable medium described herein may further include operations, features, means, or instructions for determining, based on the log of cells being empty and the cell being configured as an NSA cell, whether to attempt to camp on one or more other cells using the set of one or more frequencies based on a duration associated with maintaining the log, a mobility metric for the UE, or both, and attempting to camp on the one or more other cells using the set of one or more frequencies based on the duration associated with maintaining the log being below a first threshold, the mobility metric for the UE being below a second threshold, or both.

Some examples of the method, apparatuses, and non-transitory computer-readable medium described herein may further include operations, features, means, or instructions for attempting to camp on the one or more other cells using the set of one or more frequencies based on the log of cells including at least one entry, the cell being configured as an SA cell, or both.

In some examples of the method, apparatuses, and non-transitory computer-readable medium described herein, attempting to camp on the one or more other cells may include operations, features, means, or instructions for attempting to camp on a set of other cells in an order that may be based on one or more signal measurements for each of the set of other cells, whether each of the set of other cells may be included in the log, an ordering of cells may be included in the log, or any combination thereof.

Some examples of the method, apparatuses, and non-transitory computer-readable medium described herein may further include operations, features, means, or instructions for ordering the cells included in the log based on a quantity of times the UE may have camped on each cell included in the log, a recency with which the UE may have camped on each cell included in the log, or a combination thereof.

Some examples of the method, apparatuses, and non-transitory computer-readable medium described herein may further include operations, features, means, or instructions for associating each cell included in the log with a corresponding operator of the cell.

Some examples of the method, apparatuses, and non-transitory computer-readable medium described herein may further include operations, features, means, or instructions for receiving, from the base station, a master information block (MIB) for the cell, where the indication of a subcarrier offset for the SIB may be included in the MIB.

In some examples of the method, apparatuses, and non-transitory computer-readable medium described herein, the cell being configured as an SA cell for the radio access technology includes the cell being configured as an SA new radio (NR) cell, and the cell being configured as an NSA cell for the radio access technology includes the cell being configured as an NSA NR cell.

DETAILED DESCRIPTION

Figure 1:
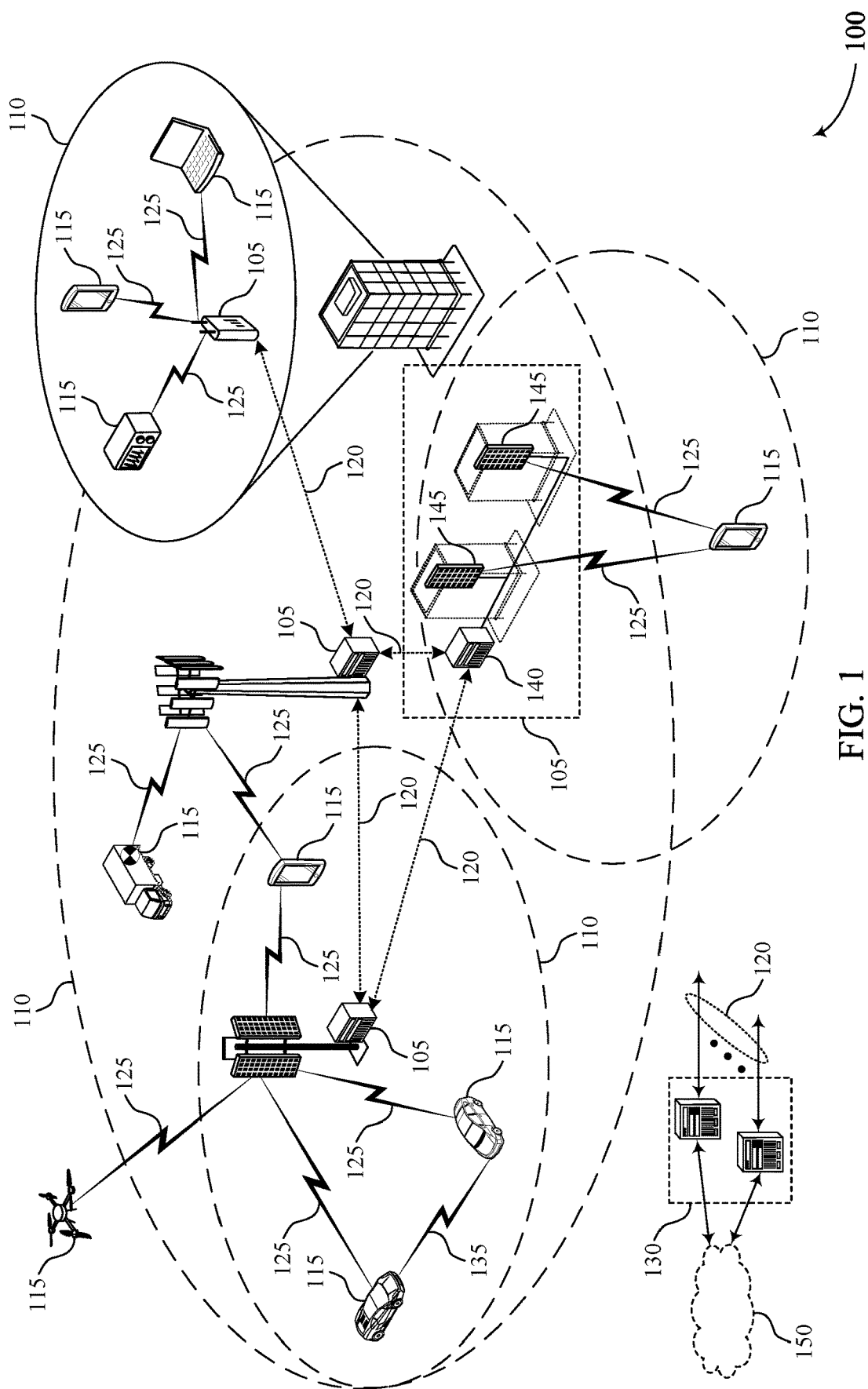
FIGS. 1 and 2 illustrate examples of wireless communications systems that support differentiation between standalone (SA) and non-standalone (NSA) cells in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies. Examples of radio access technologies include fourth generation (4G) systems, such as Long Term Evolution (LTE) systems, and fifth generation (5G) systems, which may be referred to as new radio (NR) systems. Each base station may provide communication coverage via one or more cells, for example a macro cell, a small cell, a hot spot, or other types of cells, or any combination thereof as described herein. Some cells may be configured as standalone (SA) cells (e.g., as a primary cell, such as a PCell) and others may be configured as non-standalone (NSA) cells (e.g., as a secondary cell in a dual connectively configuration, such as a PSCell in an EN-DC configuration, in which an LTE cell may be the PCell). In some cases, a single NR cell may even be configured as an SA cell for one operator and as an NSA cell for another operator (where multiple operators may share a base station and configure an associated cell differently for their respective networks/users). A given frequency band may include both SA cells and NSA cells. Whether a cell is configured as an SA cell or an NSA cell may not be explicitly indicated to a UE. Further, not accounting for whether a cell is an SA cell or an NSA cell may lead to sub-optimal operating decisions by a UE (e.g., related to selecting cells for camping attempts by the UE).

Various aspects of the described techniques generally relate to configuring the UE to determine whether a cell is configured as an SA cell or an NSA cell. Also described are various techniques the UE may use to make cell selection decisions (e.g., for camping), which leverage the UE's ability to determine whether a cell is configured as an SA cell or an NSA cell. The UE may determine whether a cell is configured as an SA cell or an NSA cell based on the value of a subcarrier offset for a system information block (SIB) of the cell (e.g., whether the subcarrier offset is within a certain range of values). The value of the subcarrier offset may correspond to the value of a related parameter, which may be referred to as $k_{SSB}$ in some cases. If the value of the subcarrier offset is not conclusive as to whether the cell is configured as an SA cell or an NSA cell, the UE may determine whether a cell is configured as an SA cell or an NSA cell based on whether a tracking area code (TAC) is configured for the cell (e.g., a cell with a TAC may be determined to be an SA cell, and a cell with no TAC may be determined to be an NSA cell).

Particular aspects of the subject matter described in this disclosure may be implemented to realize one or more of potential advantages, including the following or others that may be appreciated by one of ordinary skill in the art. The techniques employed by the UE may provide benefits and enhancements to the operation of the communication devices. For example, operations performed by the UE may provide improvements to wireless communications by reducing cell selection or cell reselection operations. Operations performed by the UE may also support improvements to power consumption, reliability for downlink and uplink beamformed communications, spectral efficiency, higher data rates and, in some examples, low latency for downlink and uplink wireless communications, among other benefits.

Aspects of the disclosure are initially described in the context of wireless communications systems. Aspects of the disclosure are further illustrated by and described with reference to apparatus diagrams, system diagrams, and flowcharts that relate to differentiation between SA and NSA cells in a wireless communications system.

FIG. 1 illustrates an example of a wireless communications system 100 that supports differentiation between SA and NSA cells in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The coverage areas 110 of the wireless communications system 100 may be referred to as cells 110 (e.g., cells 110 associated with one or more base stations 105 or configured by a network operator). Some cells 110 in the wireless communications system 100 may be configured as SA cells (e.g., as a primary cell, such as a PCell), and other cells may be configured as NSA cells (e.g., as a secondary cell in a dual connectivity configuration, such as a PSCell in an E-UTRA new radio dual connectivity (EN-DC) configuration). One or more network operators may configure the cells for their respective networks and/or users (e.g., multiple network operators may share a base station, and may configure the associated cell 110 as an SA cell or an NSA cell). In some cases, a single cell 110 may be configured as an NSA cell by one network operator, and as an SA cell by another network operator.

A UE 115 may perform a cell selection procedure to select a cell 110 for connecting to a network. In some examples, the UE 115 may perform the cell selection procedure during a radio resource control (RRC) inactive mode, an RRC idle mode, or an RRC connected mode (e.g., RRC_CONNECTED). For example, the UE 115 may camp on a cell 110 (e.g., the UE 115 may remain connected to a cell 110 during an RRC inactive or RRC idle mode). Additionally or alternatively, the cell selection procedure may be triggered based on or in response to failure of a procedure, such as radio link failure, during an RRC connected mode. The cells 110 configured as NSA cells (e.g., a PSCell) may be unavailable for camping by a UE 115, and SA-capable cells 110 may be suitable for camping attempts by a UE 115. In some examples, a given frequency band used for communications between a UE 115 and the network may include both SA cells and NSA cells. The network may not indicate to the UE 115 whether each cell 110 is configured as an SA cell or an NSA cell. As a result, the UE 115 may make operating decisions that may result in increased latency or unnecessary operations at the UE 115 (e.g., decisions related to selecting cells 110 for camping on by the UE 115 during connected or disconnected modes).

In the wireless communications system 100, a UE 115 may determine whether a cell 110 is configured as SA cell or an NSA cell based on one or more parameters received in system information. For example, a UE 115 may attempt to camp on a respective cell 110 associated with a base station 105 based on system information transmitted from the base station 105. In some cases, system information may include a subcarrier offset (e.g., a parameter configured in a master information block (MIB), such as ssb-SubcarrierOffset or $k_{SSB}$) and/or a TAC (e.g., a cell identifier (ID) configured by an operator that may be transmitted in a system information block (SIB), such as a SIB1 for example). In some cases, a synchronization signal block (SSB)) may include the MIB. Additionally or alternatively, the subcarrier offset may comprise information that the UE may use to locate (e.g., determine a frequency at which to receive) the SIB (e.g., SIB1). Additionally or alternatively, in some cases, the subcarrier offset may be a frequency domain offset between an SSB and the overall resource block grid in number of subcarriers.

The UE 115 may determine whether a cell 110 is configured as an SA cell or an NSA cell based on values of the subcarrier offset, the TAC, or both. The UE 115 may, in some examples, maintain a log of cells 110 on which the UE 115 has camped on (e.g., a cell camping history). The cell camping history may include a list of cells 110, which may be identified by a cell global identity (CGI)), a public land mobile network (PLMN) identifier (ID) and/or a frequency band on which the cells 110 were camped on. The UE 115 may use the cell camp history to determine whether a frequency band should be barred from camping attempts (e.g., if there are no SA cells 110 available for camping attempts on the frequency band).

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in an SA mode where initial acquisition and connection may be conducted by the UEs 115 via the carrier, or the carrier may be operated in an NSA mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
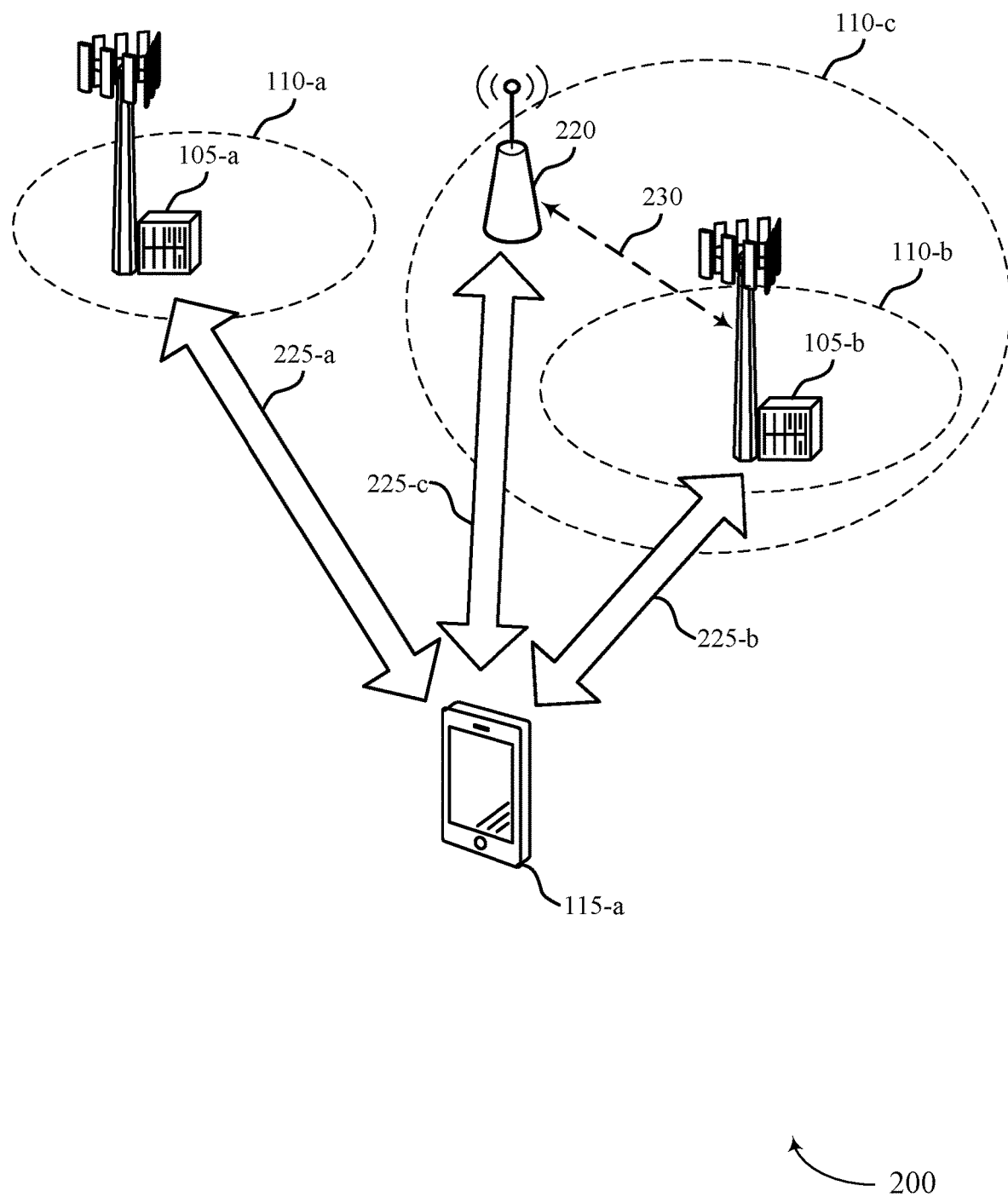

FIG. 2 illustrates an example of a wireless communications system 200 that supports differentiation between SA and NSA cells in accordance with aspects of the present disclosure. The wireless communications system 200 may implement aspects of the wireless communications system 100 as described with reference to FIG. 1. For example, the wireless communications system 200 may include a base station 105-a, a base station 105-b, and a UE 115-a, which may be examples of a base station 105 and a UE 115 as described with reference to FIG. 1. Each base station 105 may provide communication coverage via one or more cells, for example a macro cell, a small cell, a hot spot, or other types of cells, or any combination thereof as described with reference to FIG. 1. For example, the base station 105-a may serve a geographic coverage area 110-a and the base station 105-b may serve a geographic coverage area 110-b. Geographic coverage areas 110 may be referred to as cells 110. A respective base station 105 may transmit, and the UE 115 may receive, downlink communications on a radio frequency spectrum band (e.g., on at least one frequency of the radio frequency spectrum band) via a communication link 225 between the respective base station 105 and the UE 115-a (e.g., communication links 225-a, 225-b, and 225-c). Similarly, the UE 115-a may transmit, and a respective base station 105 may receive, uplink communications on the radio frequency spectrum band (e.g., on at least one frequency of the radio frequency spectrum band) via a communication link 225 between the respective base station 105 and the UE 115-a.

The wireless communications system 200 may also include an access node 220 (e.g., an LTE eNB) which may serve a geographic coverage area 110-c also referred to as a cell. In some examples, the UE 115-a may support a dual connectivity (DC) configuration. For example, the wireless communications system 200 may support multiple radio access technologies, such as 4G LTE, 5G NR, among other examples. The UE 115-a may thereby be configured to communicate with one or more radio access technologies simultaneously, such as access node 220 (e.g., an LTE eNB) and the base station 105-b (e.g., an NR gNB). The cells 110 of the wireless communications system 200 may also be configured to operate in an SA mode or an NSA mode, or both. A cell 110 configured to operate in an SA mode may be referred to as a primary cell (PCell), while a cell 110 configured to operate in an NSA mode may be referred to as a secondary cell (SCell) or a primary secondary cell (PS-Cell) in an E-UTRAN new radio dual-connectivity (EN-DC) configuration. In the example of FIG. 2, cell 110-a associated with the base station 105-a may be configured as an SA cell.

The UE 115-a may communicate with the base station 105-b and the access node 220 (e.g., an LTE eNB) according to a dual-connectivity configuration (e.g., an EN-DC configuration). The base station 105-b and the access node 220 may be configured via a link 230 such that cell 110-b associated with the base station 105-b may be configured as a secondary cell in the dual connectivity configuration (e.g., an NSA cell), and cell 110-c associated with the access node 220 may be configured as a primary cell, such as a PCell in the dual connectivity configuration (e.g., an SA cell). The link 230 may be a backhaul link (e.g., via an X2, Xn, or other interface). The UE 115-a may, in some examples, communicate via a respective cell (e.g., an SA cell, an NSA cell) associated with a base station 105 on a particular frequency. An NSA cell may, in some cases, be unavailable for the UE 115-a to camp on, for example, during an idle mode or a disconnected mode. For example, an NSA cell, such as a PSCell in an EN-DC configuration, may not transmit system information to the UE 115-a. In some cases, the UE 115-a may not receive an indication to differentiate between SA cells and NSA cells in the wireless communications system 200, and the UE 115-a may attempt to camp on a cell 110 which may be configured as an NSA cell 110, which may result in increased latency.

Various aspects of the described techniques relate to configuring the UE 115-a to determine whether a cell 110 is configured as an NSA cell or an SA cell, which may decrease a delay associated with cell selection and re-selection operations for the UE 115-a. The UE 115-a may improve cell selection operations (e.g., for camping on a cell) by differentiating between NSA cells and SA cells in the wireless communications system 200. For example, the UE 115-a may refrain from attempting to camp on a cell 110-b if the UE 115-a determines that the cell 110-b is configured as an NSA cell. Such a determination may reduce processing at the UE 115-a. For example, if the cell 110-b is configured as an NSA cell, the cell 110-b may not be configured to transmit a SIB1 (or some other type of SIB or system information) for the cell 110-b to the UE 115-a for camping on the cell 110-b, and the UE 115-a may refrain from camping on the cell 110-b. In another example, the UE 115-a may attempt to camp on a cell 110, such as the cell 110-a if the UE 115-a determines that the cell 110-a is configured as an SA cell.

When attempting to camp on a cell 110, the UE 115-a may determine whether the cell 110 is configured as an NSA cell or an SA cell for a respective network operator (e.g., a PLMN) based on one or more parameters received in system information from the cell 110 (e.g., transmitted by a base station 105 associated with the cell 110). For example, the UE 115-a may receive a MIB that includes at least a portion of the system information, which may include a subcarrier offset (e.g., a parameter indicating a subcarrier offset for an SSB of the cell 110, such as ssb-SubcarrierOffset). The value of the subcarrier offset may correspond to (e.g., map to) a value of a related parameter, which may be referred to as $k_{SSB}$ in some cases.

The value of the subcarrier offset $k_{SSB}$ may indicate a location (e.g., a frequency range or band from among a set of frequency ranges or bands) where the UE 115-a may search for a SIB for the cell 110 (e.g., SIB1). The value of the subcarrier offset $k_{SSB}$ (e.g., a determination of whether the subcarrier offset value is within a range of values) may assist the UE 115-a to differentiate between NSA cells and SA cells in the wireless communications system 200. For example, a network operator may configure the cell 110-b to be an NSA cell, and may configure a subcarrier offset such that the value of the subcarrier offset indicates to the UE 115-a that the cell 110-b may not provide one or more types of SIBs (e.g., a SIB1) for the cell 110-b.

The UE 115-a may determine that a cell 110 is configured as an SA cell or an NSA cell based on both the value of the subcarrier offset $k_{SSB}$ and a TAC of the cell 110. For example, some values of the subcarrier offset $k_{SSB}$ associated with a cell 110 may not indicate a location for one or more types of SIBs (e.g., a SIB1) of the cell 110, and the UE 115-a may determine that the cell 110 is operating in an NSA mode. However, in other examples, some values of the subcarrier offset $k_{SSB}$ associated with a cell 110, such as the cell 110-b, may indicate a location of one or more types of SIBs (e.g., a SIB1) for the cell 110-b to the UE 115-a. The UE 115-a may subsequently determine that the cell 110-b may be configured to operate in an SA mode or an NSA mode.

The UE 115-a may identify whether there is a TAC configured for the cell 110-b to determine if the cell 110-b is an NSA mode or an SA mode. In some cases, a network may configure each PCell with a TAC (e.g., each SA cell may include a TAC). In one example, the cell 110-b may have a subcarrier offset value $k_{SSB}$ that indicates the cell 110-b may be an SA cell, but the cell 110-b may not be configured with a TAC. The UE 115-a may thus determine that the cell 110-b is configured as an NSA cell (e.g., a PSCell or an SCell without a TAC). In another example, the cell 110-b may have a subcarrier offset value $k_{SSB}$ that indicates the cell 110-b may be an SA cell or an NSA cell, and the cell 110-b may be configured with a TAC. The UE 115-a may determine that the cell 110-b is configured as an SA cell (e.g., a PCell with a TAC).

As described herein, the UE 115-a may determine that a cell 110 is an NSA cell according to a value of a subcarrier offset $k_{SSB}$ associated with the cell 110. For example, certain values of the subcarrier offset $k_{SSB}$ in a frequency range may indicate that the associated cell 110 may not provide one or more types of SIBs (e.g., a SIB1) for the cell 110, and the UE 115-a may determine that the cell 110 is an NSA cell accordingly. The UE 115-a may, for example, receive system information via a communication link 205-a in a first frequency range, FR1 (e.g., frequencies less than or equal to 6 gigahertz (GHz)). The UE 115-a may monitor a downlink channel (e.g., a physical downlink control channel (PDCCH)) to receive and decode system information (e.g., a MIB), which may include an indication of a subcarrier offset (e.g., a $k_{SSB}$) with a value equal to 31, for example. The UE 115-a may determine that the location of one or more types of SIBs (e.g., a SIB1) for this cell is unknown, and thus the cell is an NSA cell, according to the value of the subcarrier offset. Additionally or alternatively, the UE 115-a may determine that the cell is configured as an NSA cell for a second frequency range, FR2 (e.g., mmW frequencies) if the UE 115-a detects that the value of the subcarrier offset in the first frequency range is 15, for example.

Particular values of the subcarrier offset $k_{SSB}$ associated with each cell 110 may indicate to the UE 115-a that the cell 110 may be either an SA cell or an NSA cell, and the UE 115-a may differentiate NSA cells from SA cells according to a TAC associated with the cell 110. In some examples, the UE 115-a may determine that a cell 110 may be configured as either an SA cell or an NSA cell for a first frequency if the value of the subcarrier offset $k_{SSB}$ is less than or equal to 23 (e.g., the SIB1 of the cell 110 may be located in the current frequency). In some other examples, the UE 115-a may determine that a cell 110 may be configured as either an SA cell or an NSA cell if the subcarrier offset $k_{SSB}$ is greater than or equal to 24 and less than or equal to 29 (e.g., the SIB1 for the cell 110 may be at a secondary frequency pointed to by a parameter such as pdcch-ConfigSIB1). In other examples, the UE 115-a may determine that a cell 110 may be configured as either an SA cell or an NSA cell for a second frequency if the value of the subcarrier offset $k_{SSB}$ is less than or equal to 11 (e.g., the SIB1 for the cell may be located at the current frequency) and/or the subcarrier offset $k_{SSB}$ is greater than or equal to 12 and less than or equal to 13 (e.g., the SIB1 for the cell may be located at a secondary location).

The UE 115-a may attempt to camp on the cell 110-a, and the base station 105-a may transmit system information to the UE 115-a via the communication link 205-a in a first frequency range, FR1 (e.g., frequencies less than or equal to 6 giga hertz (GHz)). The UE 115-a may monitor a downlink channel (e.g., a PDCCH) carrying the system information, for example a MIB, which may include an indication of a subcarrier offset $k_{SSB}$ with a value equal to 25. The UE 115-a may determine that one or more types of SIBs (e.g., a SIB1) for the cell 110-a is located at a secondary frequency (e.g., pointed to by a parameter such as pdcch-ConfigSIB1), and may determine that the cell 110-a may be either an SA cell or an NSA cell. The UE 115-a may then monitor for additional system information (e.g., a SIB1) associated with the cell 110-a, and may determine there is a TAC configured for the cell 110-a. The UE 115-a may determine that the cell 110-a is an SA cell according to the value of the subcarrier offset $k_{SSB}$ of the cell 110-a and the configuration of a TAC for the cell 110-a.

Figure 3:
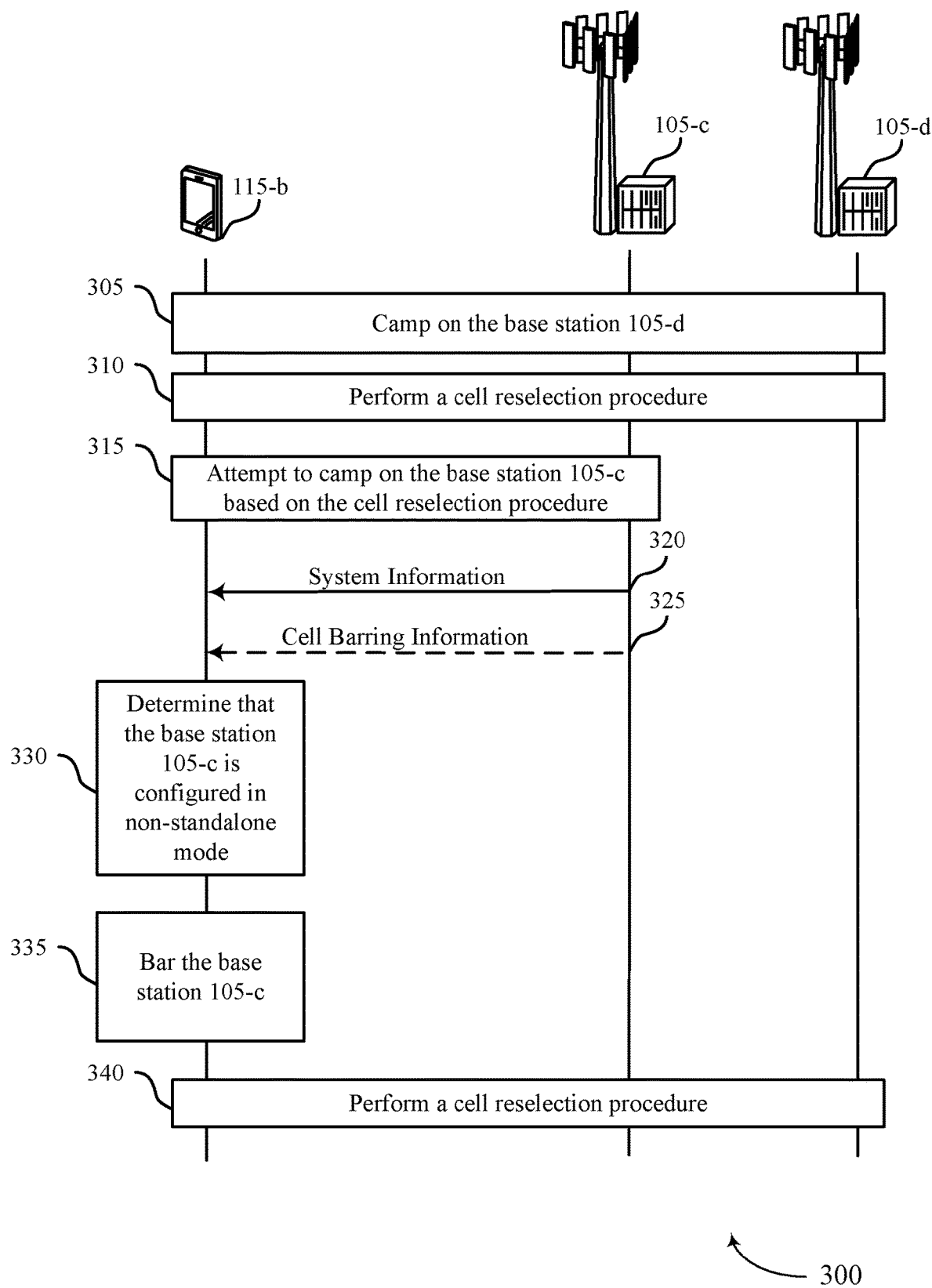
FIGS. 3 and 4 illustrate examples of process flow that support differentiation between SA and NSA cells in a wireless communications system in accordance with aspects of the present disclosure.

In the wireless communications system 200, a UE 115 may therefore receive system information (e.g., parameters configured in a MIB or SIB associated with a cell 110) before attempting to camp on a cell 110, which may indicate to the UE 115 that the cell 110 may be configured as an SA cell or an NSA cell. The UE 115 may perform cell selection operations (e.g., for camping) according to the differentiation between an SA cell or an NSA cell FIG. 3 illustrates an example of a process flow 300 that supports or otherwise utilizes differentiation between SA and NSA cells in a wireless communications system in accordance with aspects of the present disclosure. The process flow 300 may implement aspects of the wireless communications system 100 and the wireless communications system 200 as described with reference to FIGS. 1 and 2. For instance, in the example of FIG. 3, each base station 105 may provide communication coverage via one or more cells, for example a macro cell, a small cell, a hot spot, or other types of cells, or any combination thereof as described with reference to FIGS. 1 and 2. A UE 115 may communicate with at least one base station 105 (e.g., at least one cell as described with reference to FIGS. 1 and 2). Additionally or alternatively, a UE 115 may be coupled with multiple base stations 105 as part of a dual connectivity configuration (e.g., with a 4G LTE cell and a 5G NR cell). Each base station 105 may be configured to operate in an SA mode or an NSA mode as described with reference to FIGS. 1 and 2. In some cases, each base station 105 may be associated with a different network operator.

The process flow 300 may illustrate operations between a base station 105-c, a base station 105-d, and a UE 115-b, which may be examples of a base station 105 and a UE 115 as described with reference to FIGS. 1 and 2. The process flow 300 may be based on a configuration by the base station 105-c, or the base station 105-d, or both. The configuration may be implemented by the UE 115-b to improve cell selection or reselection operations for the UE 115-b by differentiating between cells configured to operate in an SA mode and an NSA mode. The process flow 300 may additionally or alternatively be implemented by the UE 115-b to achieve higher reliability and lower latency associated with wireless communications at the UE 115-b by differentiating between SA and NSA cells, among other benefits. In the following description of the process flow 300, the signals exchanged between the base station 105-c, the base station 105-d, and the UE 115-b may be transmitted in a different order than the example order shown, or the operations performed by the base stations 105-c, the base station 105-d, and the UE 115-b may be performed in different orders or at different times. Some operations may also be omitted from the process flow 300, and other operations may be added to the process flow 300.

At 305, the UE 115-b may camp on the base station 105-d, which may provide a coverage via a cell as described with reference to FIGS. 1 and 2. For example, the UE 115-b may attempt to camp on the base station 105-d according to a connection procedure (e.g., an RRC connection procedure, which may be a connected mode procedure) and the UE 115-b may camp on the cell associated with base station 105-d. The base station 105-d may transmit, and the UE 115-b may receive, downlink communications on a radio frequency spectrum band (e.g., on at least one frequency of the radio frequency spectrum band) based on the UE 115-b camping on a cell associated with the base station 105-d. For example, while camping on the cell associated with the base station 105-d, the UE 115-b may receive system information for the cell, or the UE 115-b may receive and perform one or more measurements on reference signals for the cell. While camping on the cell associated with the base station 105-d, the UE 115-b may operate in an RRC idle mode, an RRC inactive mode, or an RRC connected mode.

At 310, the UE 115-b may perform a cell reselection procedure. For example, the UE 115-b may perform the cell reselection procedure after the UE 115-b is camped on the cell associated with the base station 105-d and remains in the RRC idle mode, the RRC inactive mode, or the RRC connected mode. The UE 115-b may perform the cell reselection procedure to identify another cell which has favorable conditions (e.g., a quality of service (QoS), a reference signal received power (RSRP), a reference signal received quality (RSRQ), etc.) among neighboring cells to which the UE 115-b is allowed to camp on. In the example of FIG. 3, the UE 115-b may perform the cell reselection procedure to identify and select another cell (e.g., the base station 105-c) that provides coverage on a same frequency as the cell associated with base station 105-d. For example, the UE 115-b may search for neighboring cells with improved coverage for the UE 115-b on the same frequency and to camp on (e.g., according to detection of primary synchronization signal (PSS), secondary synchronization signal (SSS), and/or PBCH, one or more of which may in some cases be included in an SSB). The UE 115-b may select the base station 105-c and the corresponding cell (e.g., an intra-frequency neighbor cell associated with base station 105-d) based on the cell reselection procedure.

At 315, the UE 115-b may attempt to camp on the base station 105-c based on the cell reselection procedure. The base station 105-c may transmit, and the UE 115-b may receive, downlink communications on the cell based on camping on the base station 105-c. At 320, the base station 105-c may transmit a message carrying system information to the UE 115-b. For example, the system information may include a MIB, which may indicate a value of a subcarrier offset (e.g., a $k_{SSB}$ value). Additionally or alternatively, the system information may include a SIB (e.g., a SIB1) which may indicate whether a TAC is configured for the cell the UE 115-b is camping on.

As described with reference to FIG. 2, the UE 115-b may determine whether a cell associated with base station 105-c that the UE 115-b is attempting to camp on is configured to operate in an NSA mode or an SA mode based on one or both of the subcarrier offset and the TAC. In some examples, the UE 115-b may determine that the subcarrier offset does not indicate a location of one or more types of SIBs (e.g., a SIB1) for the cell associated with base station 105-c, which may indicate that the cell is configured to operate in an NSA mode. In some other examples, the UE 115-b may determine that the subcarrier offset indicates a location of one or more types of SIBs (e.g., a SIB1) for the cell associated with base station 105-c and, based on this determination, the UE 115-b may determine that the cell may be configured to operate in an NSA mode or an SA mode. In other examples, the UE 115-b may determine that there is no TAC information associated with the cell associated with the base station 105-c and, based on this determination, the UE 115-b may determine that the cell associated with the base station 105-c is configured to operate in an NSA mode. Alternatively, the UE 115-b may determine that there is TAC information for the cell associated with the base station 105-c and, based on this determination, the UE 115-b may determine that the cell is configured to operate in an SA mode.

At 325, the base station 105-c may transmit a message carrying cell barring information to the UE 115-b. The cell barring information may, in some examples, be provided along with system information. For example, the base station 105-c may transmit, and the UE 115-b may receive, a MIB carrying a parameter identifying cell barring information, which may indicate a barred cell associated with the base station 105-c. Alternatively, the base station 105-c may transmit, and the UE 115-b may receive, a SIB carrying a parameter identifying reserved cell information (e.g., a reserved cell for a network operator). In some examples, the base station 105-c may transmit, and the UE 115-b may receive, an indication to bar a particular frequency. For example, the base station 105-c may transmit, and the UE 115-b may receive, a MIB carrying a parameter (e.g., an intra-frequency reselection parameter, which in some cases may be denoted intraFreqReselection) set to bar a particular frequency for future cell camping attempts by the UE 115-b. That is, in some examples, the UE 115-b may be barred from communicating via a cell, using one or more frequencies, or both. The UE 115-b being barred from communicating via a cell may alternatively be referred to as the cell being barred.

Some cell barring operations may impact cell reselection operations for the UE 115-b by increasing a latency for identifying an acceptable cell to camp on. For example, the UE 115-b may be located in an area with poor coverage or sparse deployment of cells configured to operate in an SA mode, and the UE 115-b may be unable to find acceptable cells for reselection on other frequency. As described herein, the UE 115-b may determine whether a particular frequency should be barred based on differentiating between cells operating in an NSA mode and cells operating in an SA mode on the frequency. In some examples, the UE 115-b may determine that the cell barring information may have been a misconfiguration by the base station 105-c, and the UE 115-b may continue cell reselection procedures on the frequency to reduce a duration for finding a suitable candidate cell for camping.

At 330, the UE 115-b may determine that the base station 105-c is configured to operate in an NSA mode based on one or more parameters (e.g., subcarrier offset information, TAC information). In some examples, the UE 115-b may refrain from camping on the cell associated with base station 105-c based on the determination that the base station 105-c is configured to operate in an NSA mode. The base station 105-c, however, may be configured in other modes, such as an SA mode, and UE 115-b may continue to camp on the cell associated with the base station 105-c. At 335, the UE 115-b may bar the base station 105-c based on the determination that the base station 105-c is configured to operate in an NSA mode. The UE 115-b may bar the base station 105-c and a respective cell associated with the base station 105-*c* because the UE 115-*b* may be unable to camp on the respective cell configured as an NSA cell.

The UE 115-*b* may, in some examples, refrain from barring a respective frequency according to the camping history with the base station 105-*d* and the determination that the cell under evaluation for reselection purpose (e.g., the cell associated with the base station 105-*c*) is configured as an NSA cell. For example, the UE 115-*b* may have camped on the cell associated with the base station 105-*d*, which may indicate to the UE 115-*b* that there may be one or more SA cells (e.g., such as a respective SA cell associated with the base station 105-*d*) on the frequency that the UE 115-*b* may camp on in future cell reselection procedures. In some examples, the UE 115-*b* may store cell information associated with the base station 105-*d* in a data structure (e.g., a log of cells which the UE 115-*b* has camped on). The UE 115-*b* may determine that there may be one or more SA cells on the frequency based on the stored cell information.

At 340, the UE 115-*b* may perform another cell reselection procedure on the frequency. For example, the UE 115-*b* may search for one or more cells on the frequency (e.g., cells associated with the base station 105-*c* or the base station 105-*d* on the frequency) that the UE 115-*b* may attempt to camp on. Accordingly, the UE 115-*b* may determine to refrain from barring a particular frequency. In some examples, the UE 115-*b* may receive a message from a base station 105 and the UE 115-*b* may determine that the message is a misconfiguration according to a differentiation between NSA cells and SA cells on the frequency. The UE 115-*b* may thereby continue cell reselection procedures on the frequency if the UE 115-*b* has previously camped on a cell (e.g., an SA cell) on the same frequency.

Figure 4:
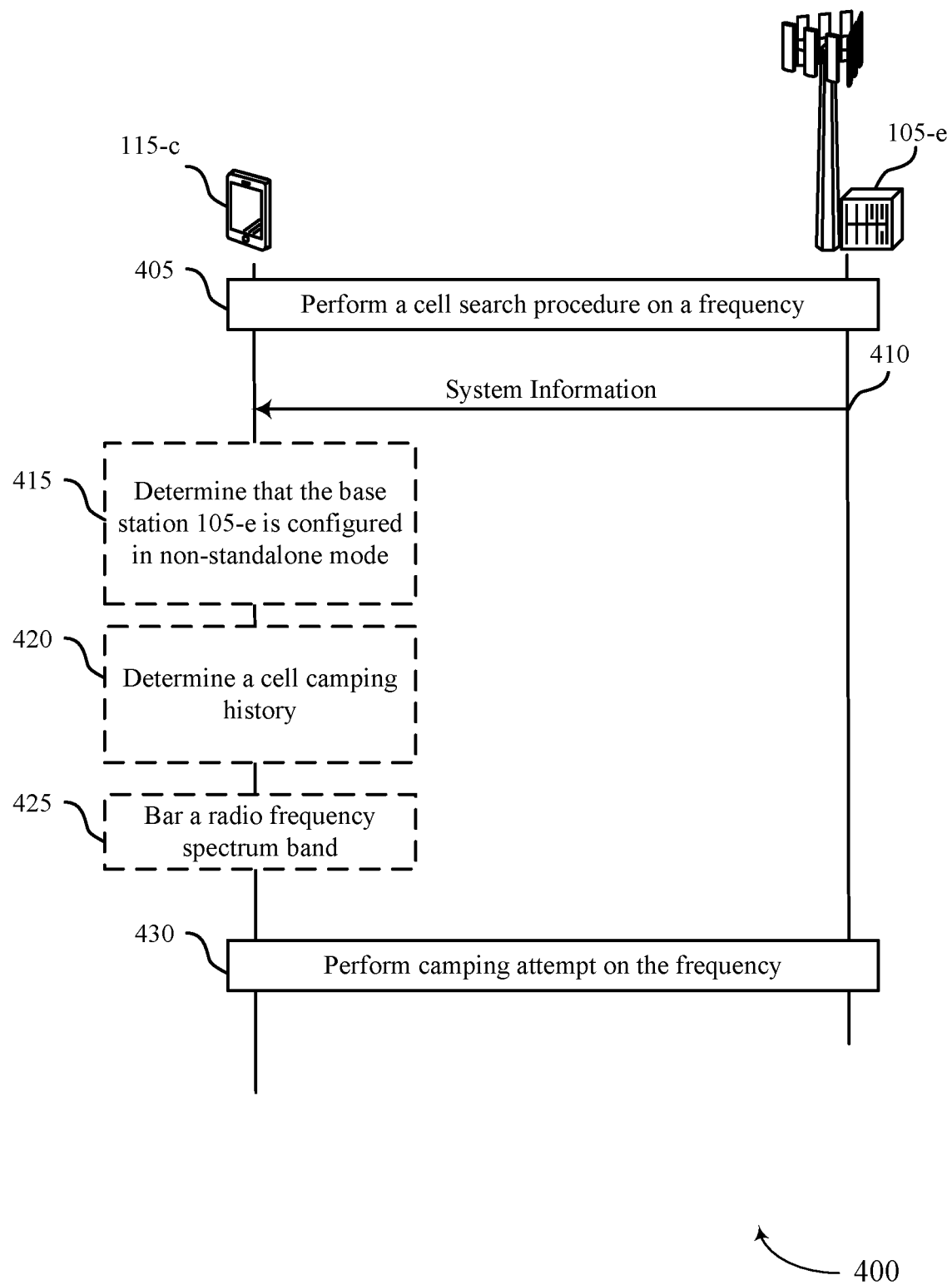

FIG. 4 illustrates an example of a process flow 400 that supports or otherwise utilizes differentiation between SA and NSA cells in a wireless communications system in accordance with aspects of the present disclosure. The process flow 400 may implement aspects of the wireless communications system 100 and the wireless communications system 200 as described with reference to FIGS. 1 and 2. For instance, in the example of FIG. 4, each base station 105 may provide communication coverage via one or more cells, for example a macro cell, a small cell, a hot spot, or other types of cells, or any combination thereof as described with reference to FIGS. 1 and 2. A UE 115 may communicate with at least one base station 105 (e.g., at least one cell as described with reference to FIGS. 1 and 2). Additionally or alternatively, a UE 115 may be coupled with multiple base stations 105 as part of a dual connectivity configuration (e.g., with a 4G LTE cell and a 5G NR cell). Each base station 105 may be configured to operate in an SA mode or an NSA mode as described with reference to FIGS. 1 and 2. A UE 115 may determine whether to bar a cell or a frequency associated with a base station 105 based on whether the base station 105 is configured to operate in an NSA mode or an SA mode.

The process flow 400 may illustrate operations between a base station 105-*e* and a UE 115-*c*, which may be examples of a base station 105 and a UE 115 as described with reference to FIGS. 1 and 2. The process flow 400 may be based on a configuration by the base station 105-*e* and implemented by the UE 115-*c* to conserve a battery life of the UE 115-*c* by differentiating between cells configured to operate in an SA mode and an NSA mode thereby improving cell selection or reselection operations. The process flow 400 may be also based on a configuration by the base station 105-*e* and implemented by the UE 115-*c* to provide higher reliability and lower latency associated with communications at the UE 115-*c* by differentiating between SA and NSA cells, among other benefits. In the following description of the process flow 400, the signals exchanged between the base station 105-*e* and the UE 115-*c* may be transmitted in a different order than the example order shown, or the operations performed by the base station 105-*e* and the UE 115-*c* may be performed in different orders or at different times. Some operations may also be omitted from the process flow 400, and other operations may be added to the process flow 400.

At 405, the UE 115-*c* may perform a cell search procedure (e.g., to determine a cell on which to camp), which may include searching for cells on a particular frequency that satisfy a signal strength metric. For example, the UE 115-*c* may perform signal strength measurements, such as RSRP, RSRQ, or the like, on reference signals (e.g., a PSS, an SSS) transmitted from the cells. In the example of FIG. 4, the UE 115-*c* may select a cell associated with the base station 105-*e*. Here, the base station 105-*e* may have a strongest signal strength compared to other cells within a vicinity of the UE 115-*c*, and the UE 115-*c* may thus attempt to camp on the cell associated with the base station 105-*e* according to the cell search procedure.

At 410, the base station 105-*e* may transmit system information to the UE 115-*c*. The system information may include a MIB, which may indicate a value of a subcarrier offset. Additionally or alternatively, the system information may include a SIB (e.g., SIB1) which may indicate whether a TAC is configured for the respective cell associated with the base station 105-*e* (e.g., the system information may potentially include a TAC, if a TAC is configured). As described with reference to FIG. 2, the UE 115-*c* may determine whether the respective cell associated with the base station 105-*e* is configured to operate in an NSA mode or an SA mode based on one or both of the subcarrier offset and the TAC. For example, the UE 115-*c* may determine that the respective cell is configured to operate in an NSA mode based on the subcarrier offset not indicating a location of one or more types of SIBs (e.g., a SIB1) for the respective cell. Alternatively, the UE 115-*c* may determine that the subcarrier offset indicates a location of one or more types of SIBs (e.g., a SIB1) for the respective cell, which may indicate that the respective cell may be configured to operate in an NSA mode or an SA mode. In some examples, the UE 115-*c* may determine that there is no TAC information associated with the respective cell and, based on this determination, the UE 115-*c* may determine that the respective cell is configured to operate in an NSA mode. Alternatively, the UE 115-*c* may determine that there is TAC information associated with the respective cell, which may indicate that respective cell is configured to operate in an SA mode.

At 415, the UE 115-*c* may determine that the base station 105-*e* may be configured to operate in an NSA mode based on one or more parameters (e.g., subcarrier offset information, TAC information, or the like) included in system information. In some examples, the UE 115-*c* may refrain from camping on the respective cell associated with the base station 105-*e* based on the determination. The system information may include an indication that the respective cell associated with the base station 105-*e* should be barred by the UE 115-*c*. Additionally or alternatively, the system information may include an indication that a frequency should be barred by the UE 115-*c*. For example, the base station 105-*e* may transmit, and the UE 115-*c* may receive, a MIB carrying a parameter (e.g., an intra-frequency reselection parameter such as intraFreqReselction) set to bar a particular frequency for future cell camping attempts by the UE 115-*c*. In some examples, the concerned frequency may be the one that the base station 105-*e* operates on. In other words, the system information may indicate that the UE 115-*c* is barred from communicating via the cell associated with the base station 105-*e*. In some examples, the UE 115-*c* being barred from communicating via the cell or frequency may be referred to as the cell or frequency being barred.

At 420, the UE 115-*c* may determine a cell camping history, for example, associated with the respective cell on a particular frequency. For example, the UE 115-*c* may collect and store, in a data structure, a log of cells on which the UE 115-*c* has camped on a particular frequency or a set of frequencies. The UE 115-*c* may determine whether a particular frequency should be barred according to information stored as part of the cell camping history. For example, if the cell camping history is non-empty for the particular frequency, the UE 115-*c* may determine that the particular frequency may include one or more SA-capable cells, and the UE 115-*c* may refrain from barring the particular frequency.

The cell camping history information may include each cell the UE 115-*c* camped on for the particular frequency. Each cell may be differentiated according to a CGI, an associated PLMN (e.g., a cell may be configured as an SA cell under one PLMN, and as an NSA cell under another PLMN), or a both. Each cell may be ordered in the cell camping history for a given frequency. For example, the UE 115-*c* may order the cells that the UE 115-*c* camped on for the particular frequency based on a rate of occurrence (e.g., cells that the UE 115-*c* may have camped on more often may be positioned near the top of the list), a decay of occurrence (e.g., cells that appear more recently than others may be positioned near the top of the list), or a combination of both (e.g., using a weighted sum by applying weight to one or both of the ordering options).

At 425, the UE 115-*c* may bar a frequency, for example, based on determining whether a respective cell associated with the base station 105-*e* is configured to operate in an SA mode or an NSA mode. Additionally or alternatively, the UE 115-*c* may bar a frequency based on a respective cell camping history on the frequency. For example, if the UE 115-*c* determines that the base station 105-*e* is configured to operate in NSA mode and a barring indication (on 105-*e*) may be received, and the UE 115-*c* determines that the cell camping history is empty, the UE 115-*c* may potentially bar the frequency. In such a scenario, the UE 115-*c* may determine whether to bar the frequency based on one or more behaviors associated with the UE 115-*c*. For example, the UE 115-*c* may bar the frequency if the mobility of the UE 115-*c* (e.g., over some prior duration) is high (e.g., based on the high mobility, the UE 115-*c* may have encountered a sufficient number of cells for the camping history to provide a reliable indication of the nature of cell in the frequency, or some frequencies may be associated with high mobility applications, such as high-speed trains as one example, and thus a high mobility metric may indicate that cells in the frequency at issue is such a special deployment). For example, the UE may determine or otherwise maintain a mobility metric and compare the mobility metric to a related mobility threshold. In some aspects, the mobility metrics may be obtained using sensors, measurements of the Doppler effect, a high-speed indication (e.g., a high-speed flag configured in a system information), or any combination thereof. Additionally or alternatively, the UE 115-*c* may bar the frequency based on the duration covered by the relevant information in the camping history (e.g., how long of a preceding time is covered by the camping history). For example, a parameter, such as a camping history duration threshold (e.g., $T_{history}$) may be configured (e.g., $T_{history}$ may be configured to 3 hours, or some other duration), and the UE 115-*c* may compare the time associated with the relevant camping history information with the camping history threshold. If the UE 115-*c* determines that the camping history information accounts for a time period greater than the camping history threshold, the UE 115-*c* may bar the frequency (e.g., the camping history may be too short to provide a reliable indication of whether all cells in the frequency are SA or NSA). Otherwise, if the UE 115-*c* determines that the cell camping history is non-empty, the UE 115-*c* may refrain from barring the frequency. Alternatively, if the UE 115-*c* determines that the base station 105-*e* is configured to operate in SA mode, the UE 115-*c* may refrain from barring the frequency.

At 430, the UE 115-*c* may continue camping attempts on the frequency if the UE 115-*c* refrained from barring the frequency. For example, the UE 115-*c* may search for neighboring cells on the frequency for the UE 115-*c* to camp on. In some examples, the UE 115-*c* may search for one or more cells on the frequency to camp on according to a signal strength metric of the cells as described herein. For example, the UE 115-*c* may search for cells on the frequency, and may select the cell with the strongest signal strength to camp on. Additionally or alternatively, the UE 115-*c* may search for cells on the frequency according to a cell camping history log. For example, the UE 115-*c* may attempt to camp on cells that may appear in the camping history log before attempting to camp on other cells on the frequency, and in some examples, the UE 115-*c* may attempt to camp on cells that may appear closer to the top of the list before camping on cells that may appear lower on the list. In some cases, the UE 115-*c* may attempt to camp on cells according to a combination of signal strength and rate of occurrence in the cell camping history log (e.g., a weighted sum of the two options). For example, the UE 115-*c* may attempt to camp on cells that have strongest signal strengths and appear near the top of the list in the cell camp history.

As described herein, the UE 115-*c* may thereby store a log of cells on which the UE 115-*c* has camped on a set of one or more frequencies. The UE 115-*c* may determine whether a frequency should be barred, and which cells to select during a cell selection or a cell reselection procedure according to the camping history log, which may reduce latency and improve the efficiency of the cell selection procedures.

Figure 5:
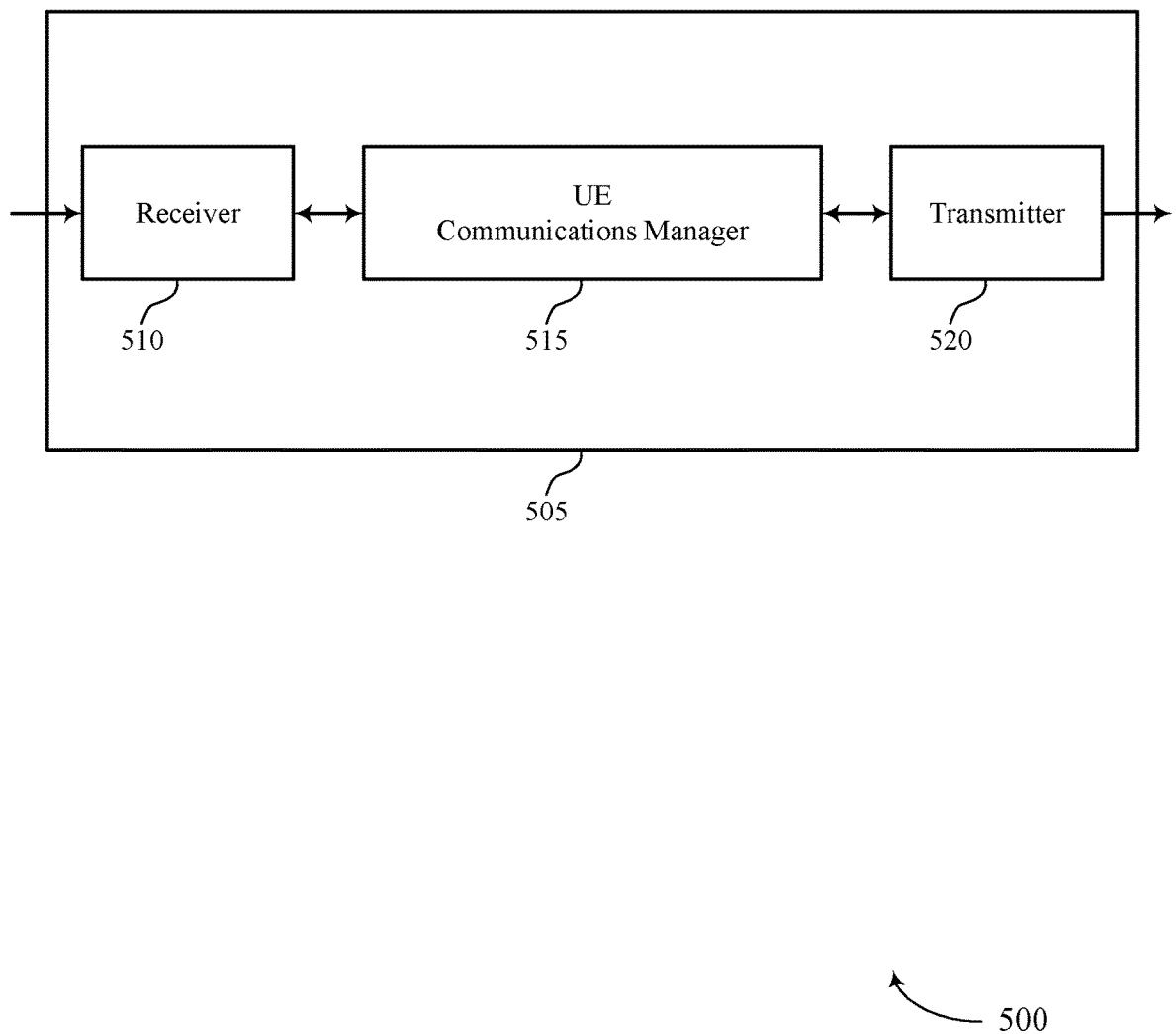
FIGS. 5 and 6 show block diagrams of devices that support differentiation between SA and NSA cells in a wireless communications system in accordance with aspects of the present disclosure.

FIG. 5 shows a block diagram 500 of a device 505 that supports differentiation between SA and NSA cells in a wireless communications system in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to differentiation between SA and NSA cells in a wireless communications system, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive an indication of a subcarrier offset for a SIB, the SIB for a cell of a wireless communications network, the cell in accordance with a radio access technology. The UE communications manager 515 may determine, based on the subcarrier offset for the SIB, whether the cell is configured as an SA cell or as an NSA cell for the radio access technology, and communicate via the wireless communications network based on whether the cell is configured as an SA cell or as a NSA cell. The UE communications manager 515 may be an example of aspects of the UE communications manager 810 described herein.

The UE communications manager 515 may enable the device 505 to improve cell selection and cell reselection operations to avoid delays in camping on a cell and accessing a wireless communications network. In some implementations, the UE communications manager 515 may enable the device 505 to determine whether a cell is configured as an SA cell or as an NSA cell. Based on implementing the cell mode determination, one or more processors of the device 505 (for example, processor(s) controlling or incorporated with the UE communications manager 515) may experience reduce power consumption and promote high reliability and low latency wireless communications (for example, downlink and uplink wireless transmissions), among other benefits.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
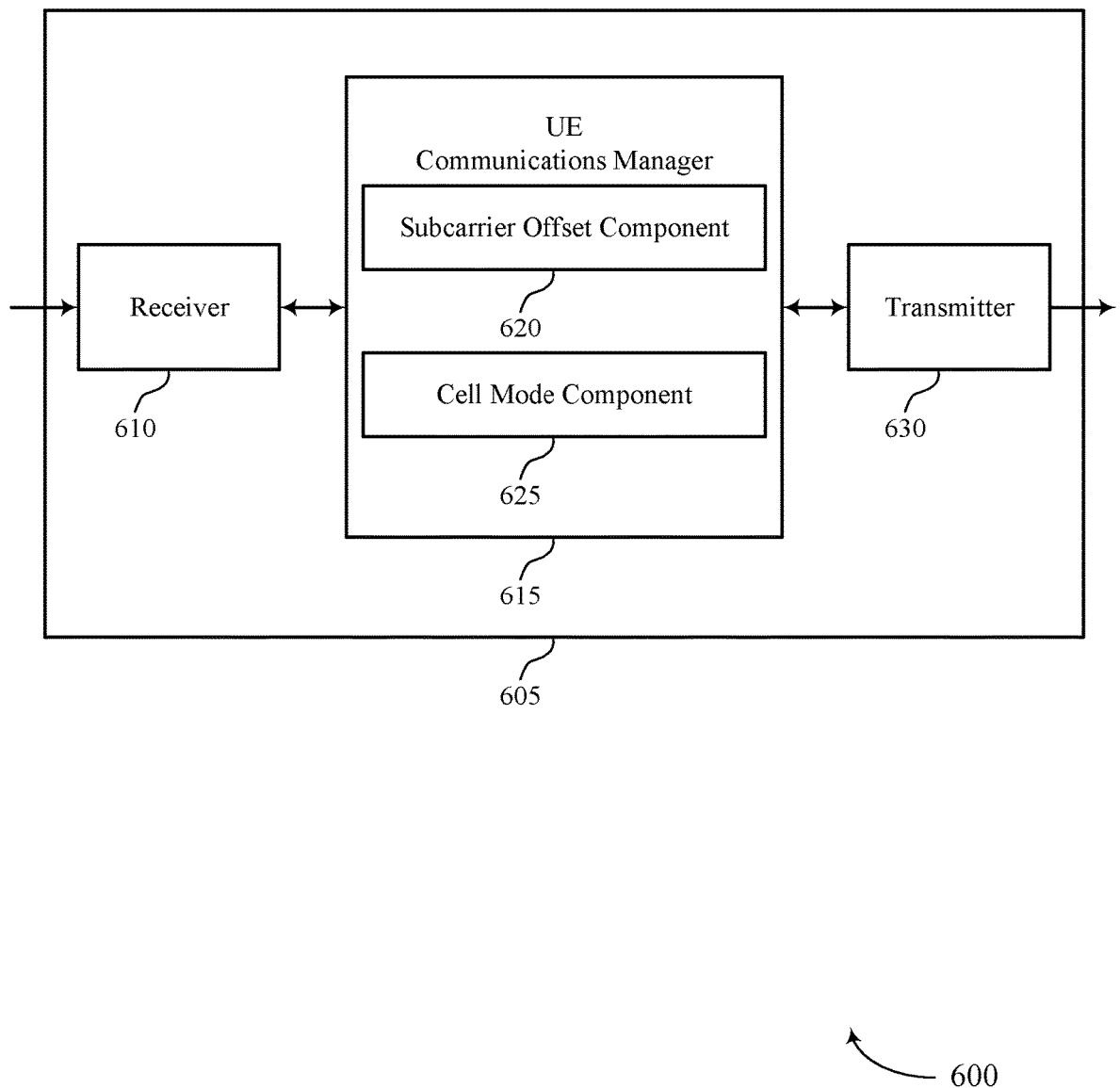

FIG. 6 shows a block diagram 600 of a device 605 that supports differentiation between SA and NSA cells in a wireless communications system in accordance with aspects of the present disclosure. The device 605 may be an example of aspects of a device 505, or a UE 115 as described herein. The device 605 may include a receiver 610, a UE communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to differentiation between SA and NSA cells in a wireless communications system, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a subcarrier offset component 620 and a cell mode component 625. The UE communications manager 615 may be an example of aspects of the UE communications manager 810 described herein.

The subcarrier offset component 620 may receive an indication of a subcarrier offset for a SIB, the SIB for a cell of a wireless communications network, the cell in accordance with a radio access technology. The cell mode component 625 may determine, based on the subcarrier offset for the SIB, whether the cell is configured as an SA cell or as an NSA cell for the radio access technology and communicate via the wireless communications network based on whether the cell is configured as an SA cell or as a NSA cell.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
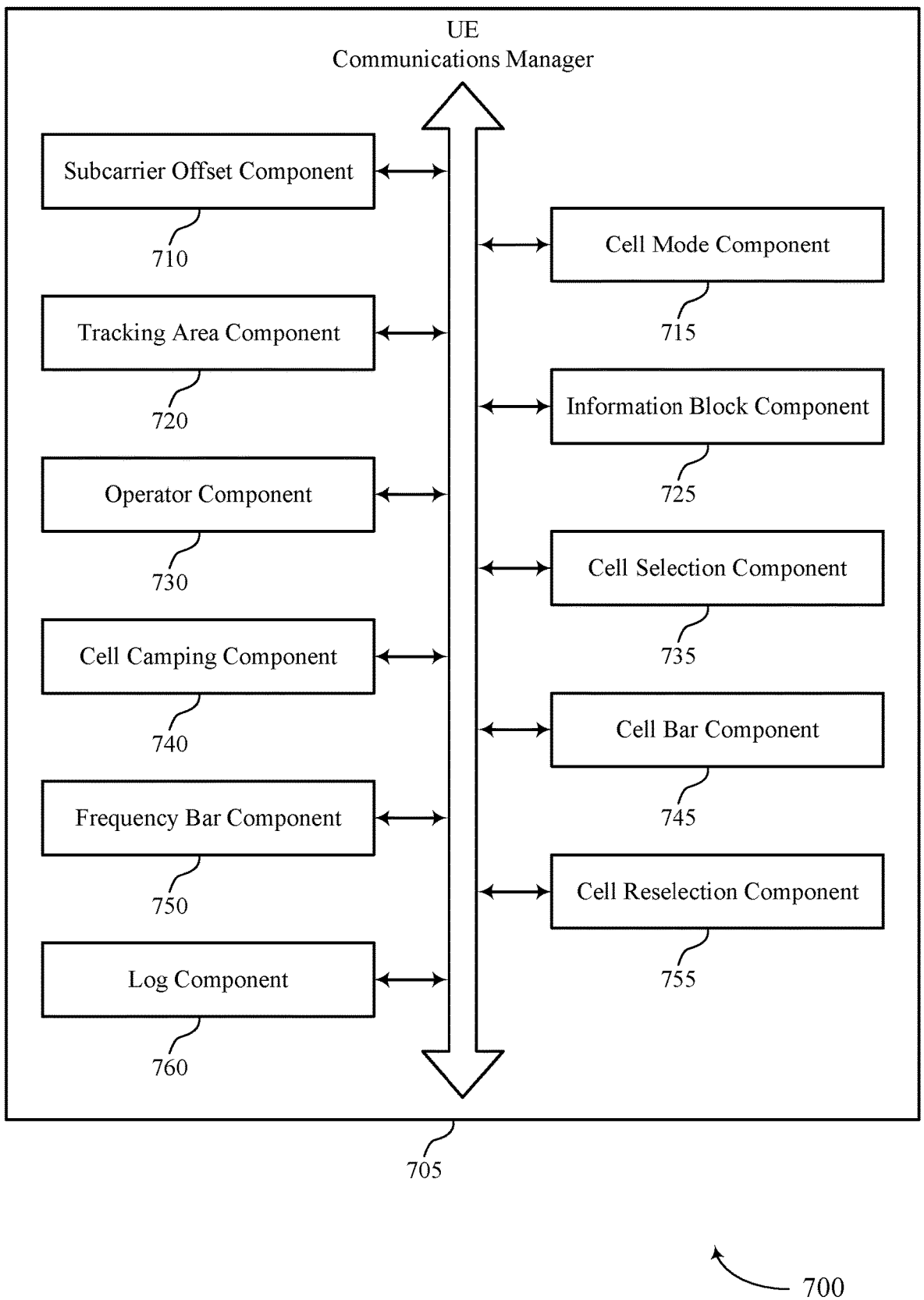
FIG. 7 shows a block diagram of a user equipment (UE) communications manager that supports differentiation between SA and NSA cells in a wireless communications system in accordance with aspects of the present disclosure.

FIG. 7 shows a block diagram 700 of a UE communications manager 705 that supports differentiation between SA and NSA cells in a wireless communications system in accordance with aspects of the present disclosure. The UE communications manager 705 may be an example of aspects of a UE communications manager 515, a UE communications manager 615, or a UE communications manager 810 described herein. The UE communications manager 705 may include a subcarrier offset component 710, a cell mode component 715, a tracking area component 720, an information block component 725, an operator component 730, a cell selection component 735, a cell camping component 740, a cell bar component 745, a frequency bar component 750, a cell reselection component 755, and a log component 760. Each of these modules may communicate, directly or indirectly, with one another (e.g., via one or more buses).

The subcarrier offset component 710 may receive an indication of a subcarrier offset for a SIB, the SIB for a cell of a wireless communications network, the cell in accordance with a radio access technology. In some examples, the subcarrier offset component 710 may determine that the subcarrier offset for the SIB is within a range. In some examples, the subcarrier offset component 710 may determine, based on the subcarrier offset for the SIB being within the range, that the cell is configured as an NSA cell. In some examples, the subcarrier offset component 710 may determine that the subcarrier offset for the SIB is within a second range. In some examples, the subcarrier offset component 710 may determine, based on the subcarrier offset for the SIB being within the second range, whether a TAC is configured for the cell. In some examples, the subcarrier offset component 710 may determine, based on whether the TAC is configured for the cell, whether the cell is configured as an SA cell or as an NSA cell.

The cell mode component 715 may determine, based on the subcarrier offset for the SIB, whether the cell is configured as an SA cell or as an NSA cell for the radio access technology. In some examples, the cell mode component 715 may communicate via the wireless communications network based on whether the cell is configured as an SA cell or as an NSA cell. In some cases, the cell being configured as an SA cell for the radio access technology includes the cell being configured as an SA NR cell. In some cases, the cell being configured as an NSA cell for the radio access technology includes the cell being configured as an NSA NR cell.

The tracking area component 720 may determine that the TAC is configured for the cell. In some examples, the tracking area component 720 may determine, based on the TAC being configured for the cell, that the cell is configured as an SA cell. In some examples, the tracking area component 720 may determine that the TAC is not configured for the cell. In some examples, the tracking area component 720 may determine, based on the TAC not being configured for the cell, that the cell is configured as an NSA cell.

The information block component 725 may receive, from a base station associated with the cell, the SIB based on the subcarrier offset for the SIB. In some examples, the information block component 725 may decode the SIB to determine whether the TAC is configured for the cell. In some examples, the information block component 725 may receive, from the base station, a MIB for the cell, where the indication of a subcarrier offset for the SIB is included in the MIB.

The operator component 730 may identify an operator of the cell. In some examples, the operator component 730 may store an indication of whether the TAC is configured for the cell, the indication specific to the operator of the cell. The cell selection component 735 may camp on a first cell of the base station or of a second base station, the camping using a set of one or more frequencies, and the first cell configured as an SA cell. The cell camping component 740 may reselect to the second cell after camping on the first cell, where receiving the subcarrier offset for the SIB for the second cell is based on reselecting to the second cell.

The cell bar component 745 may receive, based on the reselecting, a first indication that the UE is barred from communicating via the second cell using the set of one or more frequencies. The frequency bar component 750 may receive, based on the reselecting, a second indication that intra-frequency reselection is not allowed for the set of one or more frequencies. The cell reselection component 755 may reselect, based on the first cell being configured as an SA cell and determining that the second cell is configured as an NSA cell, and after receiving the first indication and the second indication, to a third cell using the set of one or more frequencies.

The log component 760 may maintain a log of cells on which the UE has camped using a set of one or more frequencies. In some examples, the log component 760 may receive a first indication that the UE is barred from communicating via the cell using the set of one or more frequencies. In some examples, the log component 760 may receive a second indication that intra-frequency reselection is not allowed for the set of one or more frequencies. In some examples, the log component 760 may determine, after receiving the first indication and the second indication, whether to attempt to camp on one or more other cells using the set of one or more frequencies based on whether the log of cells is empty, whether the cell is configured as an SA cell or as a NSA cell, or both.

In some examples, the log component 760 may determine, based on the log of cells being empty and the cell being configured as a NSA cell, whether to attempt to camp on the one or more other cells using the set of one or more frequencies based on a duration associated with maintaining the log, a mobility metric for the UE, or both. In some examples, the log component 760 may refrain from attempting to camp on the one or more other cells using the set of one or more frequencies based on the duration associated with maintaining the log satisfying a first threshold, the mobility metric for the UE satisfying a second threshold, or both. In some examples, the log component 760 may attempt to camp on the one or more other cells using the set of one or more frequencies based on the duration associated with maintaining the log being below a first threshold, the mobility metric for the UE being below a second threshold, or both.

The log component 760 may attempt to camp on the one or more other cells using the set of one or more frequencies based on the log of cells including at least one entry, the cell being configured as an SA cell, or both. In some examples, the log component 760 may attempt to camp on a set of other cells in an order that is based on one or more signal measurements for each of the set of other cells, whether each of the set of other cells is included in the log, an ordering of cells is included in the log, or any combination thereof. In some examples, the log component 760 may order the cells included in the log based on a quantity of times the UE has camped on each cell included in the log, a recency with which the UE has camped on each cell included in the log, or a combination thereof. In some examples, the log component 760 may associate each cell included in the log with a corresponding operator of the cell.

Figure 8:
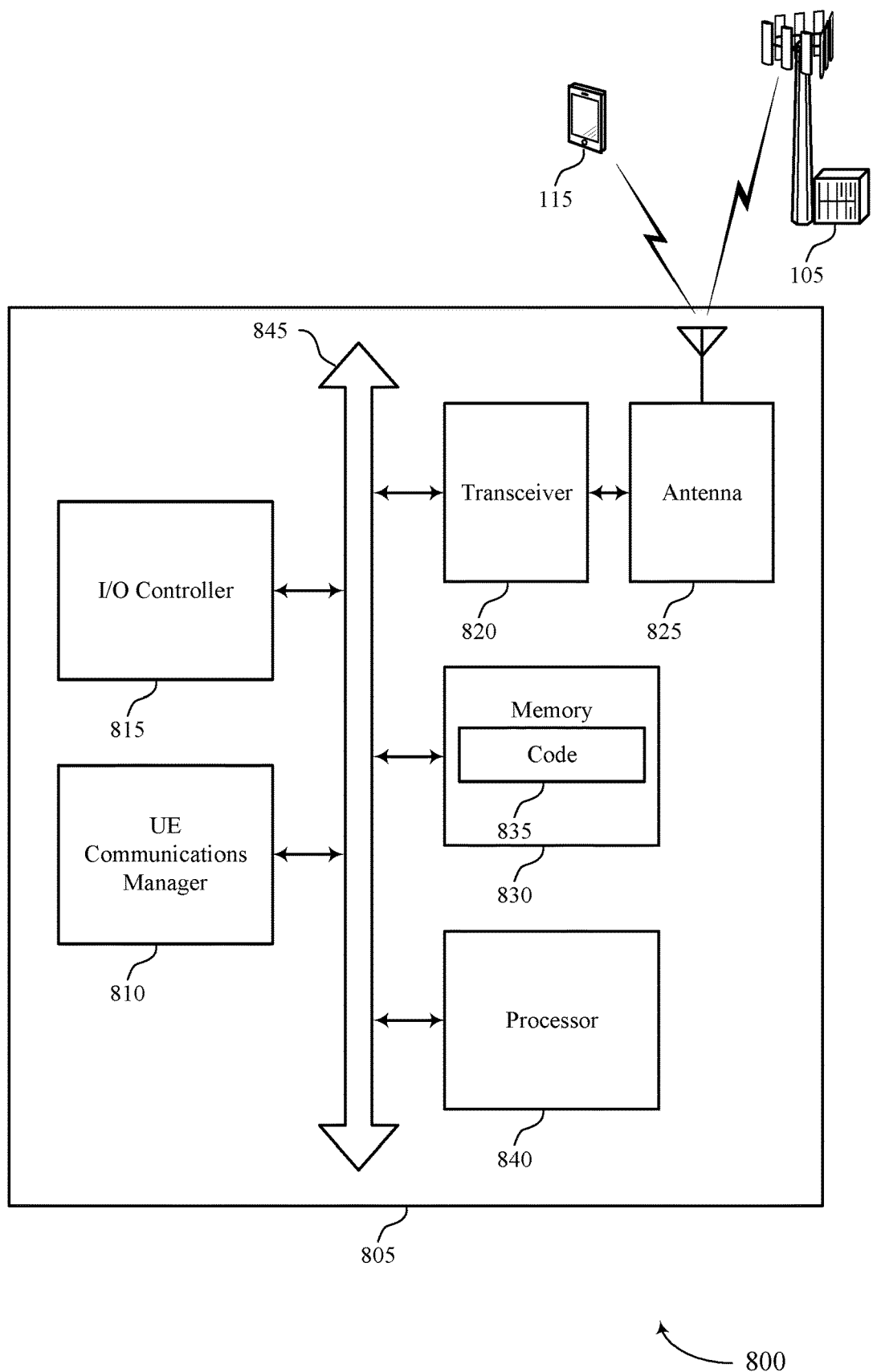
FIG. 8 shows a diagram of a system including a device that supports differentiation between SA and NSA cells in a wireless communications system in accordance with aspects of the present disclosure.

FIG. 8 shows a diagram of a system 800 including a device 805 that supports differentiation between SA and NSA cells in a wireless communications system in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive an indication of a subcarrier offset for a SIB, the SIB for a cell of a wireless communications network, the cell in accordance with a radio access technology. The UE communications manager 810 determine, based on the subcarrier offset for the SIB, whether the cell is configured as an SA cell or as an NSA cell for the radio access technology, and communicate via the wireless communications network based on whether the cell is configured as an SA cell or as an NSA cell. The UE communications manager 810 may enable the device 805 to provide enhanced beam reporting to mitigate side lobe interference. In some implementations, the UE communications manager 810 may enable the device 805 to determine whether a cell is configured as an SA cell or as an NSA cell. Based on implementing this determination, one or more processors of the device 805 (for example, processor(s) controlling or incorporated with the UE communications manager 810) may experience reduce power consumption and promote high reliability and low latency wireless communications (for example, downlink and uplink beamformed transmissions), among other benefits.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor 840 to perform various functions described herein. In some cases, the memory 830 may contain, among other things, a basic I/O system (BIOS) which may control basic hardware or software operation such as the interaction with peripheral components or devices. The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting differentiation between SA and NSA cells in a wireless communications system).

Figure 9:
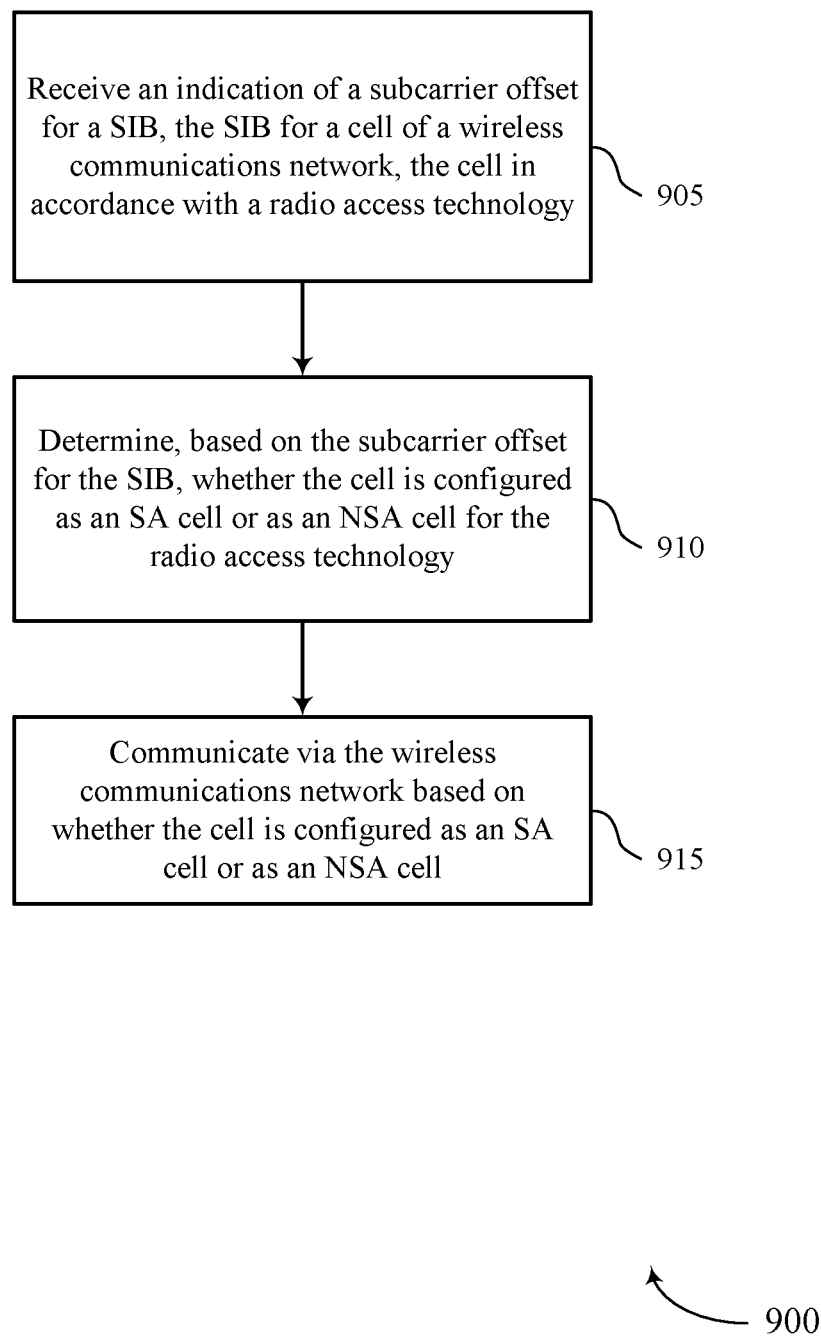
FIGS. 9 through 11 show flowcharts illustrating methods that support differentiation between SA and NSA cells in a wireless communications system in accordance with aspects of the present disclosure.

FIG. 9 shows a flowchart illustrating a method 900 that supports differentiation between SA and NSA cells in a wireless communications system in accordance with aspects of the present disclosure. The operations of method 900 may be implemented by a UE 115 or its components as described herein. For example, the operations of method 900 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive an indication of a subcarrier offset for a SIB, the SIB for a cell of a wireless communications network, the cell in accordance with a radio access technology. The operations of 905 may be performed according to the methods described herein. In some examples, aspects of the operations of 905 may be performed by a subcarrier offset component as described with reference to FIGS. 5 through 8.

At 910, the UE may determine, based on the subcarrier offset for the SIB, whether the cell is configured as an SA cell or as an NSA cell for the radio access technology. The operations of 910 may be performed according to the methods described herein. In some examples, aspects of the operations of 910 may be performed by a cell mode component as described with reference to FIGS. 5 through 8.

At 915, the UE may communicate via the wireless communications network based on whether the cell is configured as an SA cell or as an NSA cell. The operations of 915 may be performed according to the methods described herein. In some examples, aspects of the operations of 915 may be performed by a cell mode component as described with reference to FIGS. 5 through 8.

Figure 10:
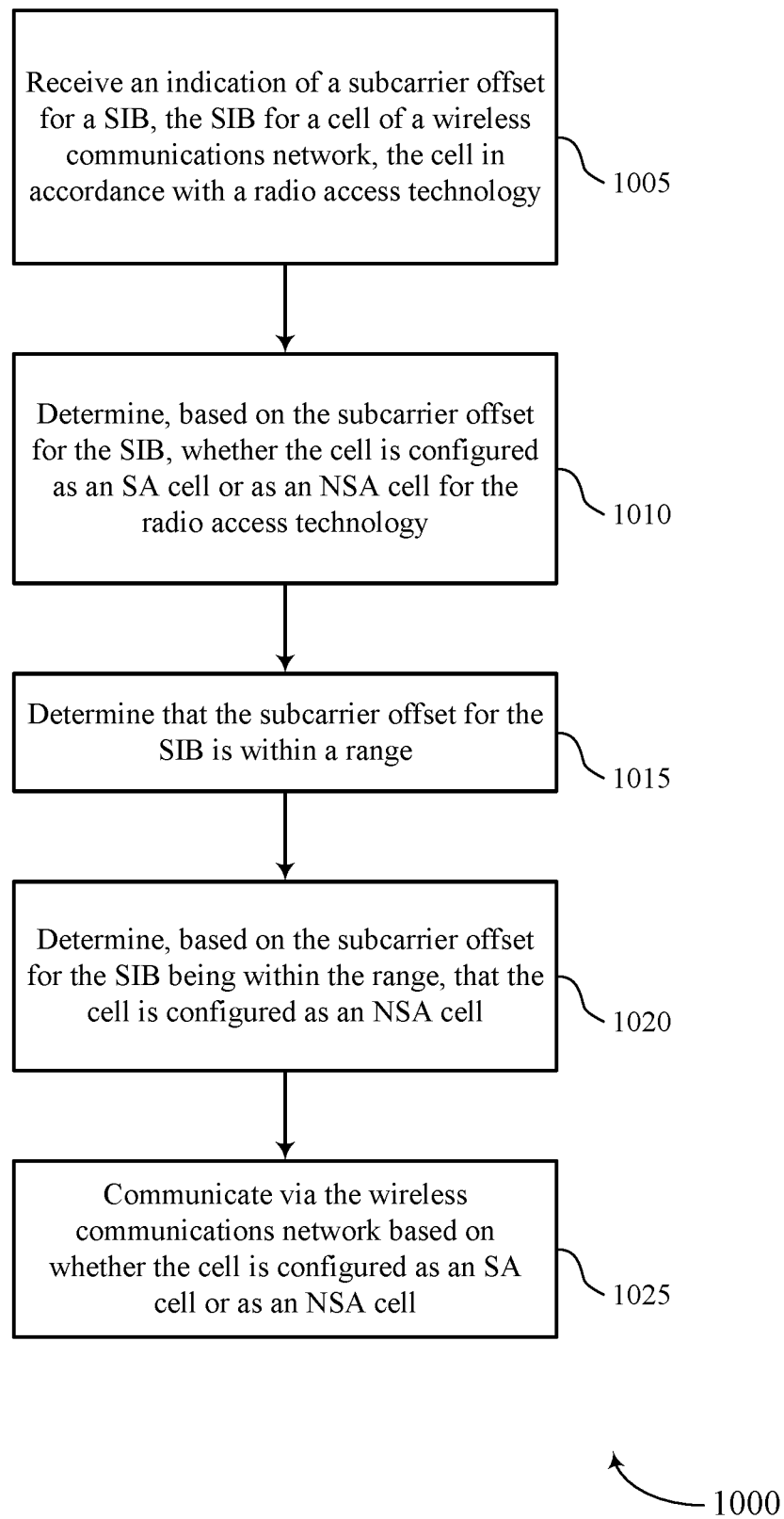

FIG. 10 shows a flowchart illustrating a method 1000 that supports differentiation between SA and NSA cells in a wireless communications system in accordance with aspects of the present disclosure. The operations of method 1000 may be implemented by a UE 115 or its components as described herein. For example, the operations of method 1000 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive an indication of a subcarrier offset for a SIB, the SIB for a cell of a wireless communications network, the cell in accordance with a radio access technology. The operations of 1005 may be performed according to the methods described herein. In some examples, aspects of the operations of 1005 may be performed by a subcarrier offset component as described with reference to FIGS. 5 through 8.

At 1010, the UE may determine, based on the subcarrier offset for the SIB, whether the cell is configured as an SA cell or as an NSA cell for the radio access technology. The operations of 1010 may be performed according to the methods described herein. In some examples, aspects of the operations of 1010 may be performed by a cell mode component as described with reference to FIGS. 5 through 8.

At 1015, the UE may determine that the subcarrier offset for the SIB is within a range. The operations of 1015 may be performed according to the methods described herein. In some examples, aspects of the operations of 1015 may be performed by a subcarrier offset component as described with reference to FIGS. 5 through 8.

At 1020, the UE may determine, based on the subcarrier offset for the SIB being within the range, that the cell is configured as an NSA cell. The operations of 1020 may be performed according to the methods described herein. In some examples, aspects of the operations of 1020 may be performed by a subcarrier offset component as described with reference to FIGS. 5 through 8.

At 1025, the UE may communicate via the wireless communications network based on whether the cell is configured as an SA cell or as an NSA cell. The operations of 1025 may be performed according to the methods described herein. In some examples, aspects of the operations of 1025 may be performed by a cell mode component as described with reference to FIGS. 5 through 8.

Figure 11:
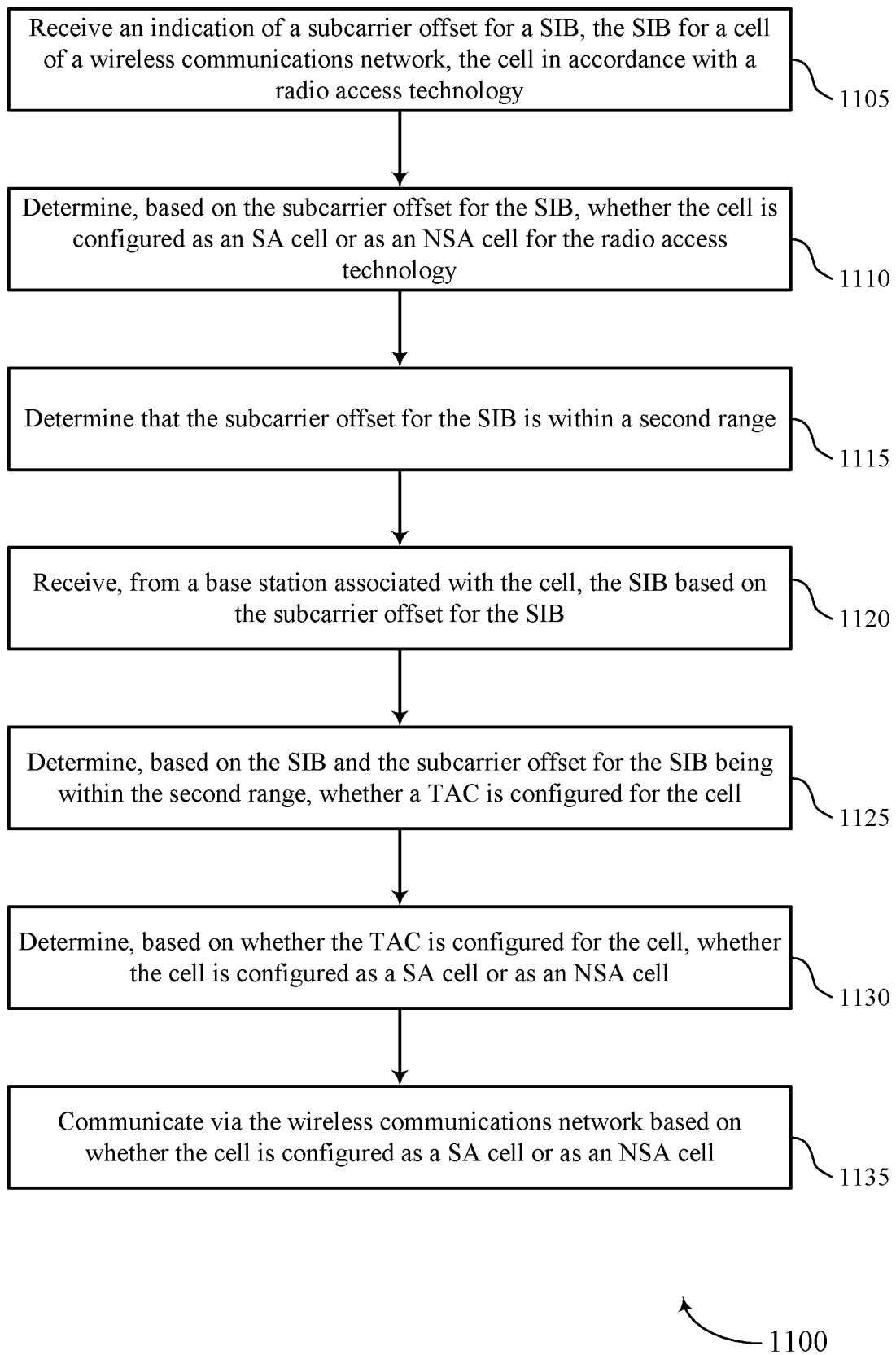

FIG. 11 shows a flowchart illustrating a method 1100 that supports differentiation between SA and NSA cells in a wireless communications system in accordance with aspects of the present disclosure. The operations of method 1100 may be implemented by a UE 115 or its components as described herein. For example, the operations of method 1100 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive an indication of a subcarrier offset for a SIB, the SIB for a cell of a wireless communications network, the cell in accordance with a radio access technology. The operations of 1105 may be performed according to the methods described herein. In some examples, aspects of the operations of 1105 may be performed by a subcarrier offset component as described with reference to FIGS. 5 through 8.

At 1110, the UE may determine, based on the subcarrier offset for the SIB, whether the cell is configured as an SA cell or as an NSA cell for the radio access technology. The operations of 1110 may be performed according to the methods described herein. In some examples, aspects of the operations of 1110 may be performed by a cell mode component as described with reference to FIGS. 5 through 8.

At 1115, the UE may determine that the subcarrier offset for the SIB is within a second range. The operations of 1115 may be performed according to the methods described herein. In some examples, aspects of the operations of 1115 may be performed by a subcarrier offset component as described with reference to FIGS. 5 through 8.

At 1120, the UE may receive, from a base station associated with the cell, the SIB based on the subcarrier offset for the SIB. The operations of 1120 may be performed according to the method described herein. In some examples, aspects of the operations of 1120 may be performed by an information block component as described with reference to FIGS. 5 through 8.

At 1125, the UE may determine, based on the SIB and the subcarrier offset for the SIB being within the second range, whether a TAC is configured for the cell. The operations of 1125 may be performed according to the methods described herein. In some examples, aspects of the operations of 1125 may be performed by a subcarrier offset component as described with reference to FIGS. 5 through 8.

At 1130, the UE may determine, based on whether the TAC is configured for the cell, whether the cell is configured as an SA cell or as an NSA cell. The operations of 1130 may be performed according to the methods described herein. In some examples, aspects of the operations of 1130 may be performed by a subcarrier offset component as described with reference to FIGS. 5 through 8.

At 1135, the UE may communicate via the wireless communications network based on whether the cell is configured as an SA cell or as an NSA cell. The operations of 1135 may be performed according to the methods described herein. In some examples, aspects of the operations of 1135 may be performed by a cell mode component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Aspect 1: A method for wireless communication at a UE, comprising: receiving an indication of a subcarrier offset for a SIB, the SIB for a cell of a wireless communications network, the cell in accordance with a radio access technology; determining, based at least in part on the subcarrier offset for the SIB, whether the cell is configured as an SA cell or as an NSA cell for the radio access technology; and communicating via the wireless communications network based at least in part on whether the cell is configured as an SA cell or as an NSA cell.

Aspect 2: The method of aspect 1, wherein determining whether the cell is configured as an SA cell or as an NSA cell comprises: determining that the subcarrier offset for the SIB is within a range; and determining, based at least in part on the subcarrier offset for the SIB being within the range, that the cell is configured as a NSA cell.

Aspect 3: The method of aspect 1, wherein determining whether the cell is configured as an SA cell or as an NSA cell comprises: determining that the subcarrier offset for the SIB is within a second range; receiving, from a base station associated with the cell, the SIB based at least in part on the subcarrier offset for the SIB; determining, based at least in part on the SIB and the subcarrier offset for the SIB being within the second range, whether a TAC is configured for the cell; and determining, based at least in part on whether the TAC is configured for the cell, whether the cell is configured as an SA cell or as a NSA cell.

Aspect 4: The method of aspect 3, wherein determining whether the cell is configured as an SA cell or as an NSA cell comprises: determining that the TAC is configured for the cell; and determining, based at least in part on the TAC being configured for the cell, that the cell is configured as an SA cell.

Aspect 5: The method of aspect 3, wherein determining whether the cell is configured as an SA cell or as a NSA cell comprises: determining that the TAC is not configured for the cell; and determining, based at least in part on the TAC not being configured for the cell, that the cell is configured as a NSA cell.

Aspect 6: The method of aspect 3, further comprising: identifying an operator of the cell; and storing an indication of whether the TAC is configured for the cell, the indication specific to the operator of the cell.

Aspect 7: The method of any of aspects 1 to 6, wherein the cell comprises a second cell of a first base station, further comprising: camping on a first cell of the first base station or of a second base station, the camping using a set of one or more frequencies, and the first cell configured as an SA cell; reselecting to the second cell after camping on the first cell, wherein receiving the subcarrier offset for the SIB for the second cell is based at least in part on reselecting to the second cell; receiving, based at least in part on the reselecting, a first indication that the UE is barred from communicating via the second cell using the set of one or more frequencies; receiving, based at least in part on the reselecting, a second indication that intra-frequency reselection is not allowed for the set of one or more frequencies; and reselecting, based at least in part on the first cell being configured as an SA cell and determining that the second cell is configured as a NSA cell, and after receiving the first indication and the second indication, to a third cell using the set of one or more frequencies.

Aspect 8: The method of any of aspects 1 to 7, further comprising: maintaining a log of cells on which the UE has camped using a set of one or more frequencies.

Aspect 9: The method of aspect 8, further comprising: receiving a first indication that the UE is barred from communicating via the cell using the set of one or more frequencies; receiving a second indication that intra-frequency reselection is not allowed for the set of one or more frequencies; and determining, after receiving the first indication and the second indication, whether to attempt to camp on one or more other cells using the set of one or more frequencies based at least in part on whether the log of cells is empty, whether the cell is configured as an SA cell or as a NSA cell, or both.

Aspect 10: The method of aspect 9, further comprising: determining, based at least in part on the log of cells being empty and the cell being configured as a NSA cell, whether to attempt to camp on the one or more other cells using the set of one or more frequencies based at least in part on a duration associated with maintaining the log, a mobility metric for the UE, or both; and refraining from attempting to camp on the one or more other cells using the set of one or more frequencies based at least in part on the duration associated with maintaining the log satisfying a first threshold, the mobility metric for the UE satisfying a second threshold, or both.

Aspect 11: The method of aspect 9, further comprising: determining, based at least in part on the log of cells being empty and the cell being configured as a NSA cell, whether to attempt to camp on the one or more other cells using the set of one or more frequencies based at least in part on a duration associated with maintaining the log, a mobility metric for the UE, or both; and attempting to camp on the one or more other cells using the set of one or more frequencies based at least in part on the duration associated with maintaining the log being below a first threshold, the mobility metric for the UE being below a second threshold, or both.

Aspect 12: The method of aspect 9, further comprising: attempting to camp on the one or more other cells using the set of one or more frequencies based at least in part on the log of cells including at least one entry, the cell being configured as an SA cell, or both.

Aspect 13: The method of aspect 9, wherein attempting to camp on the one or more other cells comprises: attempting to camp on a plurality of other cells in an order that is based at least in part on one or more signal measurements for each of the plurality of other cells, whether each of the plurality of other cells is included in the log, an ordering of cells is included in the log, or any combination thereof.

Aspect 14: The method of aspect 13, further comprising: ordering the cells included in the log based at least in part on a quantity of times the UE has camped on each cell included in the log, a recency with which the UE has camped on each cell included in the log, or a combination thereof.

Aspect 15: The method of aspect 8, further comprising: associating each cell included in the log with a corresponding operator of the cell.

Aspect 16: The method of any of aspects 1 to 15, further comprising: receiving, from the base station, a MIB for the cell, wherein the indication of a subcarrier offset for the SIB is included in the MIB.

Aspect 17: The method of any of aspects 1 to 16, wherein: the cell being configured as an SA cell for the radio access technology comprises the cell being configured as an SA NR cell; and the cell being configured as an NSA cell for the radio access technology comprises the cell being configured as an NSA NR cell.

Aspect 18: An apparatus comprising at least one means for performing a method of any of aspects 1 to 17.

Aspect 19: An apparatus for wireless communications comprising a processor; memory in electronic communication with the processor; and instructions stored in the memory and executable by the processor to cause the apparatus to perform a method of any of aspects 1 to 17.

Aspect 20: A non-transitory computer-readable medium storing code for wireless communications, the code comprising instructions executable by a processor to perform a method of any of aspects 1 to 17.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving an indication of a subcarrier offset for a system information block, the system information block for a cell of a wireless communications network, the cell in accordance with a radio access technology;
    determining, based at least in part on the subcarrier offset for the system information block, whether the cell is configured as a standalone cell or as a non-standalone cell for the radio access technology; and
    communicating via the wireless communications network based at least in part on whether the cell is configured as a standalone cell or as a non-standalone cell.

2. The method of claim 1, wherein determining whether the cell is configured as a standalone cell or as a non-standalone cell comprises:
    determining that the subcarrier offset for the system information block is within a range; and
    determining, based at least in part on the subcarrier offset for the system information block being within the range, that the cell is configured as a non-standalone cell.

3. The method of claim 1, wherein determining whether the cell is configured as a standalone cell or as a non-standalone cell comprises:
    determining that the subcarrier offset for the system information block is within a second range;
    receiving, from a base station associated with the cell, the system information block based at least in part on the subcarrier offset for the system information block;
    determining, based at least in part on the system information block and the subcarrier offset for the system information block being within the second range, whether a tracking area code is configured for the cell; and
    determining, based at least in part on whether the tracking area code is configured for the cell, whether the cell is configured as a standalone cell or as a non-standalone cell.

4. The method of claim 3, wherein determining whether the cell is configured as a standalone cell or as a non-standalone cell comprises:
    determining that the tracking area code is configured for the cell; and
    determining, based at least in part on the tracking area code being configured for the cell, that the cell is configured as a standalone cell.

5. The method of claim 3, wherein determining whether the cell is configured as a standalone cell or as a non-standalone cell comprises:
    determining that the tracking area code is not configured for the cell; and
    determining, based at least in part on the tracking area code not being configured for the cell, that the cell is configured as a non-standalone cell.

6. The method of claim 3, further comprising:
identifying an operator of the cell; and
storing an indication of whether the tracking area code is configured for the cell, the indication specific to the operator of the cell.

7. The method of claim 1, wherein the cell comprises a second cell of a first base station, further comprising:
camping on a first cell of the first base station or of a second base station, the camping using a set of one or more frequencies, and the first cell configured as a standalone cell;
reselecting to the second cell after camping on the first cell, wherein receiving the subcarrier offset for the system information block for the second cell is based at least in part on reselecting to the second cell;
receiving, based at least in part on the reselecting, a first indication that the UE is barred from communicating via the second cell using the set of one or more frequencies;
receiving, based at least in part on the reselecting, a second indication that intra-frequency reselection is not allowed for the set of one or more frequencies; and
reselecting, based at least in part on the first cell being configured as a standalone cell and determining that the second cell is configured as a non-standalone cell, and after receiving the first indication and the second indication, to a third cell using the set of one or more frequencies.

8. The method of claim 1, further comprising:
maintaining a log of cells on which the UE has camped using a set of one or more frequencies.

9. The method of claim 8, further comprising:
receiving a first indication that the UE is barred from communicating via the cell using the set of one or more frequencies;
receiving a second indication that intra-frequency reselection is not allowed for the set of one or more frequencies; and
determining, after receiving the first indication and the second indication, whether to attempt to camp on one or more other cells using the set of one or more frequencies based at least in part on whether the log of cells is empty, whether the cell is configured as a standalone cell or as a non-standalone cell, or both.

10. The method of claim 9, further comprising:
determining, based at least in part on the log of cells being empty and the cell being configured as a non-standalone cell, whether to attempt to camp on the one or more other cells using the set of one or more frequencies based at least in part on a duration associated with maintaining the log, a mobility metric for the UE, or both; and
refraining from attempting to camp on the one or more other cells using the set of one or more frequencies based at least in part on the duration associated with maintaining the log satisfying a first threshold, the mobility metric for the UE satisfying a second threshold, or both.

11. The method of claim 9, further comprising:
determining, based at least in part on the log of cells being empty and the cell being configured as a non-standalone cell, whether to attempt to camp on the one or more other cells using the set of one or more frequencies based at least in part on a duration associated with maintaining the log, a mobility metric for the UE, or both; and
attempting to camp on the one or more other cells using the set of one or more frequencies based at least in part on the duration associated with maintaining the log being below a first threshold, the mobility metric for the UE being below a second threshold, or both.

12. The method of claim 9, further comprising:
attempting to camp on the one or more other cells using the set of one or more frequencies based at least in part on the log of cells including at least one entry, the cell being configured as a standalone cell, or both.

13. The method of claim 9, wherein attempting to camp on the one or more other cells comprises:
attempting to camp on a plurality of other cells in an order that is based at least in part on one or more signal measurements for each of the plurality of other cells, whether each of the plurality of other cells is included in the log, an ordering of cells is included in the log, or any combination thereof.

14. An apparatus for wireless communication, comprising:
a processor,
memory coupled with the processor; and
instructions stored in the memory and executable by the processor to cause the apparatus to:
receive an indication of a subcarrier offset for a system information block, the system information block for a cell of a wireless communications network, the cell in accordance with a radio access technology;
determine, based at least in part on the subcarrier offset for the system information block, whether the cell is configured as a standalone cell or as a non-standalone cell for the radio access technology; and
communicate via the wireless communications network based at least in part on whether the cell is configured as a standalone cell or as a non-standalone cell.

15. The apparatus of claim 14, wherein the instructions to determine whether the cell is configured as a standalone cell or as a non-standalone cell are executable by the processor to cause the apparatus to:
determine that the subcarrier offset for the system information block is within a range; and
determine, based at least in part on the subcarrier offset for the system information block being within the range, that the cell is configured as a non-standalone cell.

16. The apparatus of claim 14, wherein the instructions to determine whether the cell is configured as a standalone cell or as a non-standalone cell are executable by the processor to cause the apparatus to:
determine that the subcarrier offset for the system information block is within a second range;
receive, from a base station associated with the cell, the system information block based at least in part on the subcarrier offset for the system information block;
determine, based at least in part on the system information block and the subcarrier offset for the system information block being within the second range, whether a tracking area code is configured for the cell; and
determine, based at least in part on whether the tracking area code is configured for the cell, whether the cell is configured as a standalone cell or as a non-standalone cell.

17. The apparatus of claim 16, wherein the instructions to determine whether the cell is configured as a standalone cell or as a non-standalone cell are executable by the processor to cause the apparatus to:
determine that the tracking area code is configured for the cell; and determine, based at least in part on the tracking area code being configured for the cell, that the cell is configured as a standalone cell.

18. The apparatus of claim 16, wherein the instructions to determine whether the cell is configured as a standalone cell or as a non-standalone cell are executable by the processor to cause the apparatus to:
   determine that the tracking area code is not configured for the cell; and
   determine, based at least in part on the tracking area code not being configured for the cell, that the cell is configured as a non-standalone cell.

19. The apparatus of claim 14, wherein the instructions are further executable by the processor to cause the apparatus to:
   maintain a log of cells on which the UE has camped using a set of one or more frequencies.

20. A non-transitory computer-readable medium storing code for wireless communication at a user equipment (UE), the code comprising instructions executable by a processor to:
   receive an indication of a subcarrier offset for a system information block, the system information block for a cell of a wireless communications network, the cell in accordance with a radio access technology;
   determine, based at least in part on the subcarrier offset for the system information block, whether the cell is configured as a standalone cell or as a non-standalone cell for the radio access technology; and
   communicate via the wireless communications network based at least in part on whether the cell is configured as a standalone cell or as a non-standalone cell.

* * * * *